United States Patent
Watanabe

(10) Patent No.: US 7,752,163 B2
(45) Date of Patent: Jul. 6, 2010

(54) IMAGE PICKUP APPARATUS, CONTROL METHOD, AND STORAGE MEDIUM

(75) Inventor: Hajime Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 11/940,861

(22) Filed: Nov. 15, 2007

(65) Prior Publication Data

US 2008/0154982 A1     Jun. 26, 2008

(30) Foreign Application Priority Data

Dec. 21, 2006  (JP) .............................. 2006-344282

(51) Int. Cl.
G06F 17/30  (2006.01)
(52) U.S. Cl. ...................... 707/602; 707/609; 707/640; 707/690; 707/791; 707/822
(58) Field of Classification Search .......... 707/600–831
See application file for complete search history.

(56) References Cited

U.S. PATENT DOCUMENTS

2003/0200229 A1 *  10/2003  Cazier ........................ 707/200

FOREIGN PATENT DOCUMENTS

JP    2001-238112 A    8/2001

\* cited by examiner

*Primary Examiner*—Isaac M Woo
(74) *Attorney, Agent, or Firm*—Canon U.S.A., Inc. I.P. Division

(57) ABSTRACT

An image pickup apparatus includes an image pickup unit configured to capture an image of an object; a storing unit configured to store file path information of the image; a specifying unit configured to specify a file path for the image based on the file path information; a determination unit configured to determine whether a second image having a second file path that is the same as the file path exists on an external recording medium; a file path changing unit configured to, if it is determined by the determination unit that the second image having the second file path that is the same as the file path exists on the external recording medium, change the second file path recorded on the external recording medium; and a recording control unit configured to record the image on the external recording medium.

7 Claims, 16 Drawing Sheets

IMAGE PICKUP APPARATUS, CONTROL METHOD, AND STORAGE MEDIUM

BACKGROUND OF THE INVENTION

1. Field of the Invention

The present invention relates to an image pickup apparatus such as a camera. More particularly, the present invention relates to an apparatus configured to record data on a replaceable recording medium.

2. Description of the Related Art

As a recording medium for recording image data captured by shooting, a conventional digital camera uses a small-sized memory card including a semiconductor memory having a capacity of several hundreds of megabytes or several gigabytes. Such a conventional digital camera records the captured image data on a memory card inserted in a memory card slot provided at the camera body.

However, in the case of using a single memory card, only a limited number of images can be recorded on the memory card. That is, it is necessary for a user to use a plurality of memory cards to record a large number of images. Accordingly, the market has desired a recording medium of a larger capacity.

Under such an environment surrounding a semiconductor memory, a hard disk drive (HDD), which uses a magnetic disk as a recording medium, has recently been widely used as a recording medium having a larger capacity and is more inexpensive in terms of running costs. An HDD has been generally used as a peripheral device for a personal computer (PC). A universal serial bus (USB) connection method has been widely used to connect an HDD to a PC. In this regard, Japanese Patent Application Laid-Open No. 2001-238112 discusses a method for using an HDD externally connected to a digital camera as a recording medium.

In the case of using a USB-connected peripheral device, a PC, which generally serves as a host device, has a sufficient power supply source. Accordingly, it is not necessary for a user to be so much careful about managing a power supply to a peripheral device.

On the other hand, in the case where a USB-connected peripheral device, such as an HDD, is connected to a battery-driven mobile apparatus, such as a digital camera, which serves as a host device for the USB-connected peripheral device, it is necessary for a user to be careful about a power supply management for a system including the mobile apparatus and the peripheral device. That is, in this case, it is useful to provide and shift to a power saving mode, which enables low power consumption by positively stopping a power supply to a peripheral device.

With respect to a certain USB-connected peripheral device, more than a few seconds may be required from the time the peripheral device is powered on to the time the USB-connected device becomes finally active. In addition, with respect to a peripheral device, such as an HDD, more than a few seconds may be required from the time the built-in magnetic disk starts to rotate to the time data can be written on and read from the HDD.

When a shooting operation is performed with such an HDD connected to a digital camera (host device) as a recording medium, a user may lose an appropriate shooting opportunity. That is, the time required to shift from the power saving mode to the operable state (normal power consumption mode) is significant with respect to a performance of an electronic apparatus, such as a digital camera, which is required to respond quickly to a user instruction.

In this regard, when a recording medium, such as a memory card, is inserted into a memory card slot of a digital camera, the digital camera stores free space information, folder information, and file information about the inserted recording medium in a non-volatile memory in the digital camera. Such a digital camera can continue shooting operations based on the information about the recording medium stored in the digital camera until the recording medium is replaced with another recording medium.

Meanwhile, an HDD cannot be easily incorporated into a digital camera body. Accordingly, in the case of using an HDD as a recording medium for a digital camera, the HDD is externally connected to the digital camera via a cable, as an external recording medium.

When such an external recording medium is used, it is not easy to detect a connection or disconnection of the recording medium, contrary to a case of using a small-sized memory card that can be easily inserted into or dismounted from the camera body, in which case it is easy to detect a connection state by using a switch. Accordingly, in the case of using such an external recording medium, whether an external recording medium is connected (connection status) is detected by an electrical communication. However, when the power supply to the external recording medium is stopped in the power saving mode, the connection state cannot be detected.

Accordingly, when an external recording medium is replaced during a power saving mode, it cannot be detected that the external recording medium has been replaced. Thus, information about a recording medium stored in an image pickup apparatus may be different from information about a currently connected external recording medium.

SUMMARY OF THE INVENTION

The present invention is directed to an image pickup apparatus configured to operate with a high response capability even when an external recording medium connected thereto is in a power saving mode.

According to an aspect of the present invention, an image pickup apparatus includes an image pickup unit configured to capture an image of an object; a storing unit configured to store file path information of the image; a specifying unit configured to specify a file path for the image based on the file path information; a determination unit configured to determine whether a second image having a second file path that is the same as the file path exists on an external recording medium; a file path changing unit configured to, if it is determined by the determination unit that the second image having the second file path that is the same as the file path exists on the external recording medium, change the second file path recorded on the external recording medium; and a recording control unit configured to record the image on the external recording medium, the image having the file path specified by the specifying unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
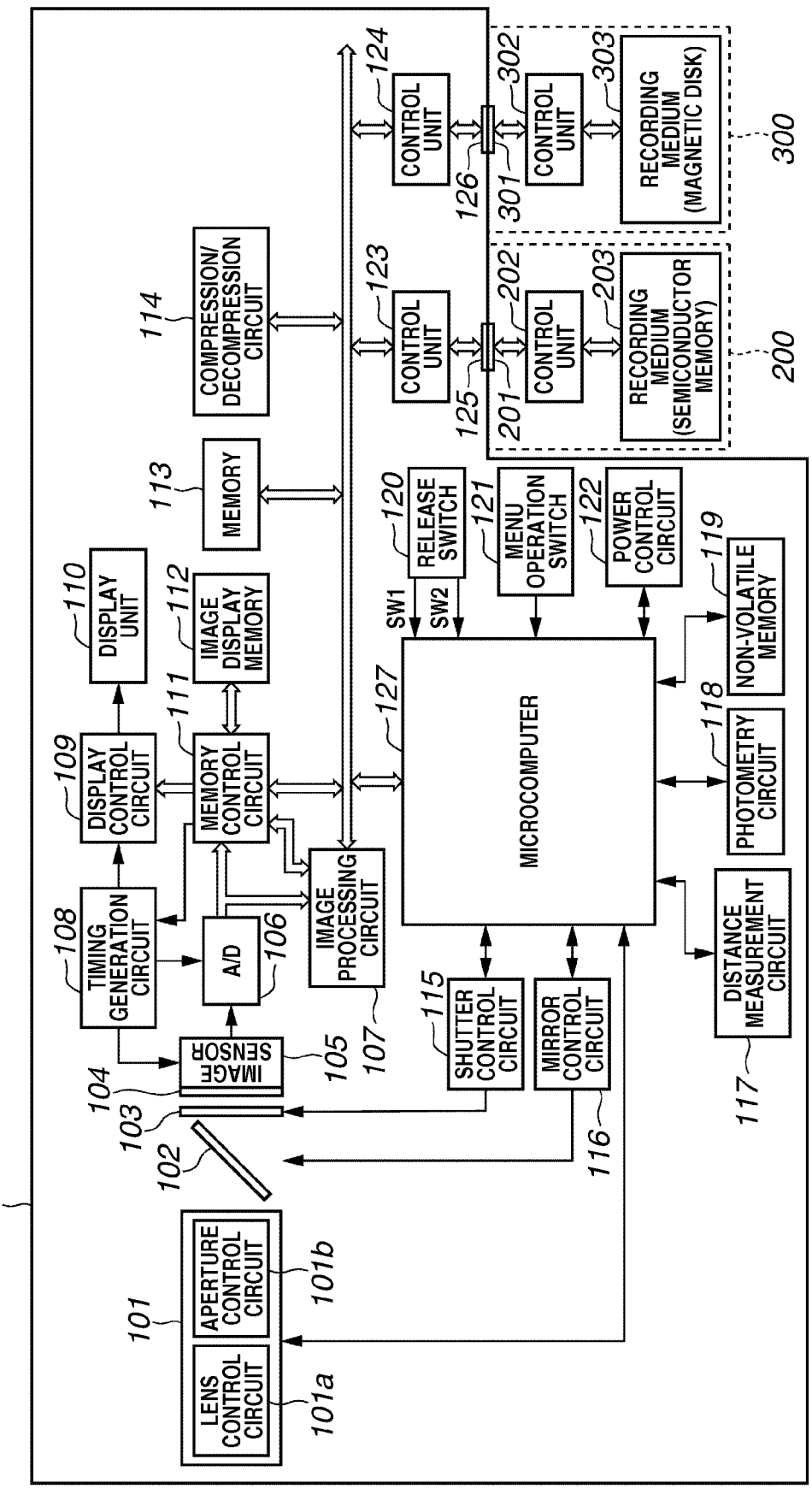
FIG. 1 illustrates an example of a functional configuration of an image pickup apparatus according to a first exemplary embodiment of the present invention.

Now, a first exemplary embodiment of the present invention will be described below. FIG. 1 illustrates an example of a configuration of an interchangeable-lens digital camera according to the first exemplary embodiment of the present invention.

Referring to FIG. 1, a digital camera (image pickup apparatus) 100 according to the present exemplary embodiment includes a lens unit 101, which is an interchangeable lens unit including a plurality of lens groups. The lens unit 101 communicates with a microcomputer 127, controls an auto focus (AF) lens control circuit 101a in the lens unit 101, and moves a focusing lens in the lens unit 101 to perform focusing processing. The moving amount is calculated based on an output from a distance measurement circuit 117. Furthermore, the lens unit 101 includes an aperture control circuit 101b, which changes an optical aperture value.

A quick return mirror 102 is disposed in a shooting optical path. The quick return mirror 102 can move between a position at which the quick return mirror 102 leads object light from the lens unit 101 to a finder optical system (not illustrated) and a position at which the quick return mirror 102 retracts to the outside of the shooting optical path. Furthermore, the digital camera 100 includes a shutter 103 and an optical filter 104, which is covered with a dust-proof glass. In addition, the digital camera 100 includes an image sensor 105 that converts an optical image into an electrical signal and an analog-to-digital (A/D) converter 106 that converts an analog signal output from the image sensor 105 into a digital signal.

A timing generation circuit 108 supplies a clock signal and a control signal to the image sensor 105 and the A/D converter 106. The timing generation circuit 108 is controlled by a memory control circuit 111 and the microcomputer 127.

An image processing circuit 107 performs image processing, such as pixel interpolation processing and development processing, on image data from the A/D converter 106 or image data from the memory control circuit 111, based on processing data appended to the image data. The memory control circuit 111 controls the A/D converter 106, the image processing circuit 107, the timing generation circuit 108, an image display memory 112, a memory 113, and a compression/decompression circuit 114.

Data from the A/D converter 106 is written to the image display memory 112 or the memory 113 via the image processing circuit 107 and the memory control circuit 111.

A display unit 110 includes a thin-film transistor (TFT) and a liquid crystal display (LCD). Image data to be displayed, stored in the image display memory 112, is displayed by the display unit 110 under the control of a display control circuit 109.

The memory 113 includes an image buffer area for temporarily storing non-decompressed image data obtained by shooting, a working buffer area for storing processing data used in developing image data by the image processing circuit 107, a result of a calculation relating to AF/automatic exposure (AE)/auto white balance (AWB), and other data to be temporarily used, and a file buffer area for storing compressed image data compressed by the compression/decompression circuit 114.

The memory 113 has a storage capacity large enough to store a predetermined number of still images and a predetermined time length of moving images. A large number of images can be written to the memory 113 at a high speed in the case of continuous shooting for continuously shooting a plurality of still images.

The compression/decompression circuit 114 compresses image data into a Joint Photographic Experts Group (JPEG) data by an adaptive discrete cosine transform (ADCT) and decompresses the converted JPEG data. The compression/decompression circuit 114 reads the image data from the memory 113 and compresses or decompresses the read image data. Then, the compression/decompression circuit 114 writes the thus-processed data to the memory 113.

Moreover, the digital camera 100 includes a shutter control circuit 115 for controlling the shutter 103. A mirror control circuit 116 drives and controls the quick return mirror 102 into and outside of the shooting optical path.

The distance measurement circuit 117 controls the focusing lens of the lens unit 101 based on an output from the distance measurement circuit 117. A photometry circuit 118 measures a luminance of an object and controls an exposure based on the output from the photometry circuit 118.

The microcomputer 127 controls the digital camera 100 having the above-described configuration. A non-volatile memory 119 records and stores various programs, such as an image pickup processing program, an image processing program, and a program for recording generated image file data on a recording medium. Furthermore, the non-volatile memory 119 stores various programs, such as an operating system (OS) for implementing and executing a multi-task configuration of the above-described programs and an adjustment value for performing various control operations.

The digital camera 100 includes the following operation members.

Operation members (e.g., release switch 120 and menu operation switch 121) can be operated by a user to issue an instruction for starting various operations to the microcomputer 127. In some embodiments, the release switch 120 and the menu operation switch 121 each include one or more of the following: buttons, switches, dials, and a touch panel. The release switch 120 and the menu operation switch 121 operate as follows.

The release switch 120 can be operated by a user to issue an instruction for starting the following series of processing. In the present embodiment, the release switch 120 comprises a button. When the user half-presses (SW1) the release switch 120, the release switch 120 is turned on to instruct starting an operation for preparing for a shooting, such as AF processing and AE processing. When the user fully presses (SW2) the release switch 120, the release switch 120 is turned on to instruct the following various processing. The processing that can be instructed by fully pressing the release switch 120 includes image pickup processing for writing a signal read from the image sensor 105 to the memory 113 as image data via the A/D converter 106 and 111, white balance correction processing performed according to a white balance mode set to the image data using the image processing circuit 107, development processing, and recording processing for reading the developed image data from the memory 113 and compressing the developed image data by the compression/decompression circuit 114 to write the compressed image data to the recording medium.

The menu operation switch 121 includes one or more of the following: menu keys, set keys, and an arrow key (not illustrated), according to some embodiments. The menu operation switch 121 can be operated by a user to issue an instruction for starting various operations, such as changing various settings (shooting conditions and development conditions set for the digital camera 100) and selecting a power saving mode of an external recording medium, while looking at a display of the display unit 110.

Now, components of the digital camera 100 and additional members connected to the digital camera 100 will be described below.

A power control circuit 122 includes a battery detection circuit, a direct current (DC)-DC converter, and a switching circuit for switching a block to supply power. The power control circuit 122 detects a battery mounting state, a type of the mounted battery, and a remaining capacity of the battery. The power control circuit 122 controls the DC-DC converter based on a result of the detection and an instruction from the microcomputer 127, to supply a necessary voltage to each component and the recording medium for a sufficient length of time.

A control unit 123 controls a recording medium, such as a memory card. A connector 125 connects a recording medium, such as a memory card, with the digital camera 100. A control unit 124 controls an external recording medium, such as an HDD. A connector 126 connects the digital camera 100 with an external recording medium, such as an HDD.

In the present exemplary embodiment, the digital camera 100 includes two methods (the interface and the connector) for mounting a recording medium. However, the number of the interface and the connector for mounting a recording medium is not limited to this. That is, one or more interfaces and connectors for mounting a recording medium can be used. Furthermore, a combination of interfaces and connectors of different systems can be used.

The digital camera 100 can use a memory card 200 and an external recording medium 300. The memory card 200 includes a recording unit 203, such as a semiconductor memory, a control unit 202 that is an interface with the digital camera 100 and controls the recording unit 203, and a connector 201 for connecting to the digital camera 100. A card slot for inserting the memory card 200 is provided at a housing of the digital camera 100. The entire memory card 200 is housed in the housing. Furthermore, a closable cover (not illustrated) for covering the card slot is provided at the housing.

The recording medium 300 can be a memory card or an HDD, which can be connected to the digital camera 100 via a USB connection method. An HDD is used as the external recording medium 300 in the present exemplary embodiment. The external recording medium 300 includes a recording unit 303, such as a magnetic disk, a control unit 302 that is an interface with the digital camera 100 and controls the recording unit 303, and a connector 301 for connecting to the digital camera 100.

In the present exemplary embodiment, a control unit 124, which is an interface with the external recording medium 300, includes a host controller for implementing a function of the digital camera 100 as a host device for the USB-connected peripheral device. The control unit 302 includes a device controller for implementing a function of the USB-connected device. A connector 126 is provided at the housing of the digital camera 100. A USB cable (not illustrated) can be inserted in the connector 126 for connecting with the external recording medium 300 via a USB cable. The external recording medium 300 can be supplied with power via the USB cable. In the present embodiment, the external recording medium 300 consumes a very large amount of power. Accordingly, the digital camera 100 includes a power saving mode for stopping a power supply to the external recording medium 300 based on a result of a predetermined determination operation.

Figure 2:
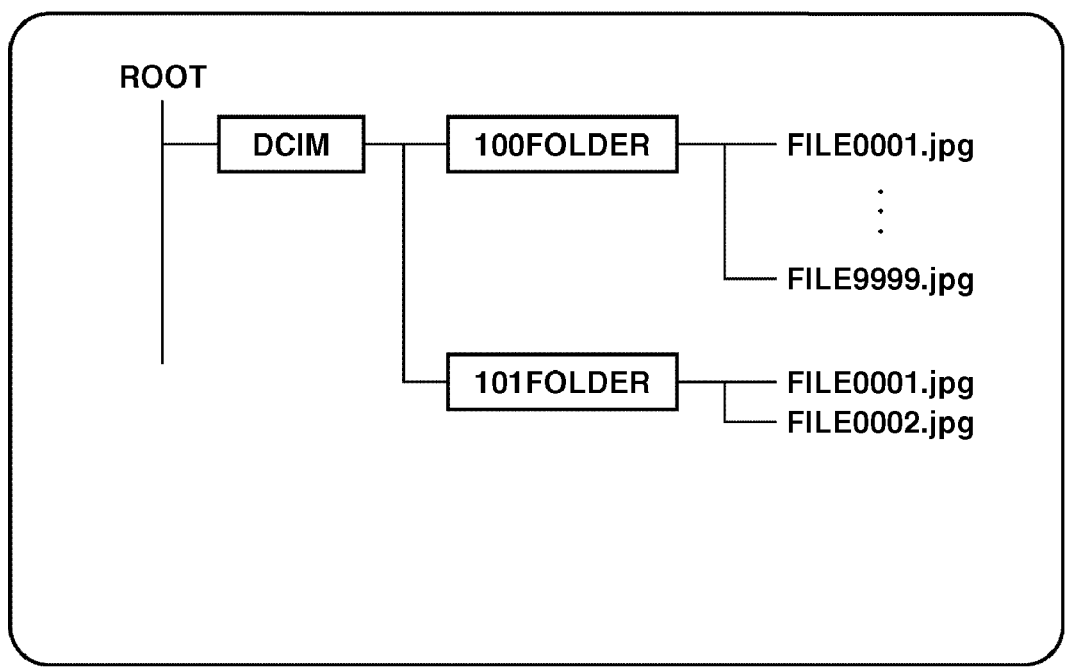
FIG. 2 schematically illustrates an example of a structure of folders according to the first exemplary embodiment of the present invention.

FIG. 2 schematically illustrates an example of a structure of folders (directory) generated on the external recording medium 300 according to the present exemplary embodiment. In the present exemplary embodiment, the folder structure is configured based on Design rule for Camera File system (DCF). In the example in FIG. 2, at the top of the directory, a folder having a folder name "DCIM" is provided. Below this, in the second layer (one layer below the folder DCIM), a folder having a folder name including a folder number M (three-digit number) and a folder identification name N (four-roman character text string) is provided. In the third layer (two layers below the folder DCIM), a file having a file name including a file identification name n (four-roman character text string), a file number m (four-digit number), and a three-digit extension is provided.

In the example in FIG. 2, 9,999 files ("FILE0001.jpg" through "FILE9999.jpg"), which are image data, are provided in a layer immediately below the second-layer folder "100FOLDER". Furthermore, two files ("FILE0001.jpg" and "FILE0002.jpg"), which are captured image data, are provided in a layer immediately below the second-layer folder "101FOLDER".

The digital camera 100, mounted with the external recording medium 300 having the above-described folder structure, records image files having file names with serial file numbers, during every shooting operation. For example, when a shooting operation is performed with the structure in FIG. 2, a captured image file is recorded as a file having a file name "FILE0003.jpg", in a layer below the folder "101FOLDER". In this case, a path for the file "FILE0003.jpg" is "¥DCIM¥101FOLDER¥FILE0003.jpg".

Now, an operation of the digital camera 100 having the above-described configuration will be described below with reference to the flow charts of FIGS. 3 through 6.

When an external recording medium 300 is used for the first time, it is necessary to perform mounting processing for making the external recording medium 300 usable. The folder structure of the external recording medium 300 is not recognized by the digital camera 100 before the mounting processing for the external recording medium 300 is completed. Accordingly, the digital camera 100 cannot capture an image or record image data on the external recording medium 300 because, in this state, a file number cannot be assigned.

In the following processing, the external recording medium 300 is connected to the connector 301 of the digital camera 100 via the USB cable. Before starting the processing in FIG. 3, the external recording medium 300 having the folder structure (FIG. 2) has been subjected to the mounting processing so that a file can be recorded on and read from the external recording medium 300. Before starting the processing in FIG. 3, the digital camera 100 has recognized the folder structure of the external recording medium 300 and a file number to be assigned to a captured image file has been specified.

Figure 3:
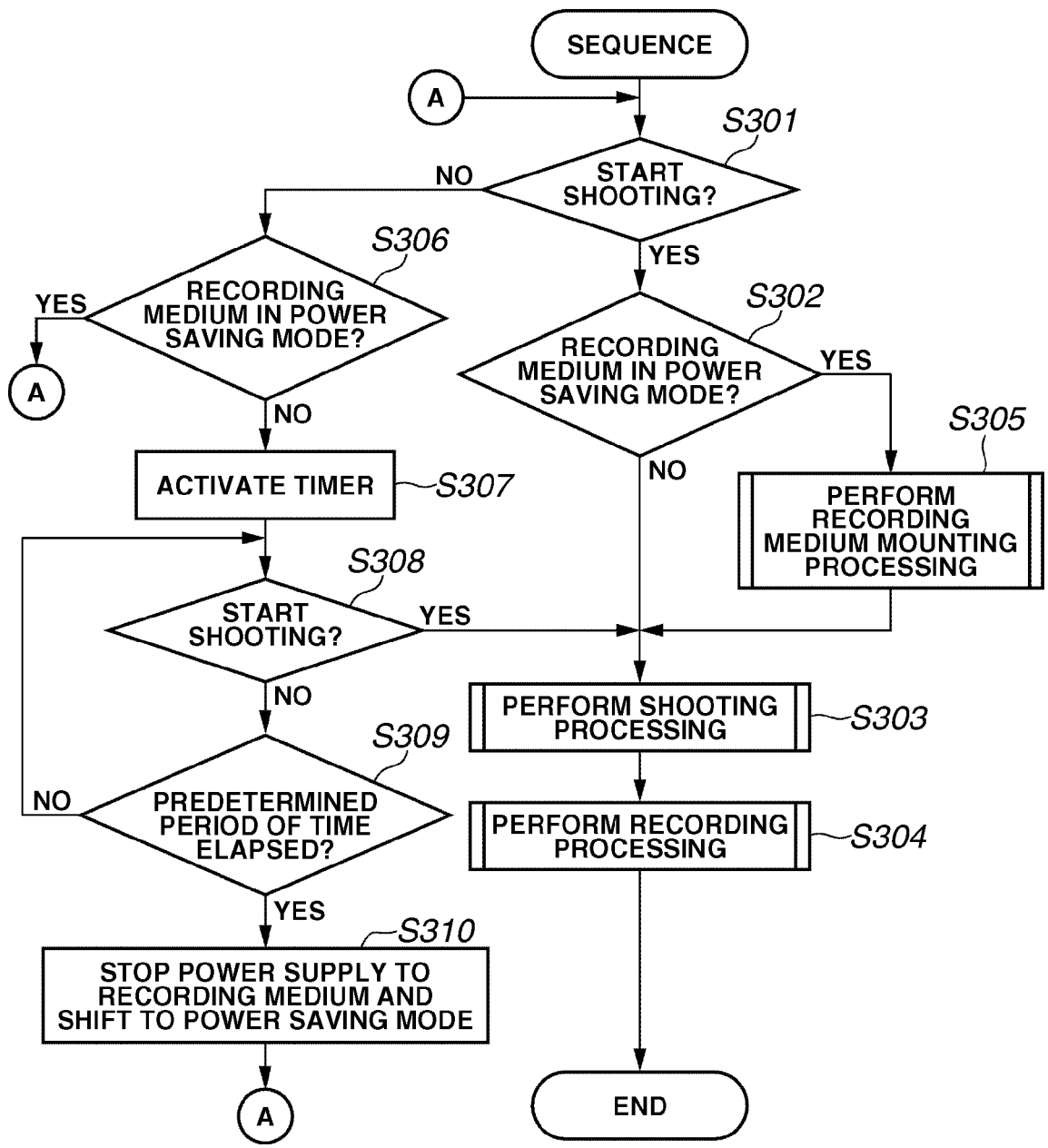
FIG. 3 is a flow chart illustrating an example of a main sequence performed by the image pickup apparatus according to the first exemplary embodiment of the present invention.

FIG. 3 is a flow chart illustrating an example of a main sequence performed by the digital camera 100 according to the present exemplary embodiment. More specifically, FIG. 3 is a flow chart illustrating an example of a series of processing performed from the shooting operation to the recording operation and an example of a sequence for processing performed when the external recording medium 300 is in a power saving mode.

Each processing described with reference to the flow chart of FIG. 3 can be performed by a multi-task configuration.

Referring to FIG. 3, in step S301, the microcomputer 127 of the digital camera 100 determines whether the user has operated the release switch 120 to issue an instruction for starting a shooting operation.

If it is determined in step S301 that the user has operated the release switch 120 to issue an instruction for starting a shooting operation (YES in step S301), then the microcomputer 127 advances to step S302. In step S302, the microcomputer 127 determines whether the external recording medium 300 is in the power saving mode. If it is determined in step S302 that the external recording medium 300 is not in the power saving mode (NO in step S302), then the microcomputer 127 advances to step S303. In step S303, the microcomputer 127 performs shooting processing, which will be described in detail below.

When the shooting processing in step S303 is completed, the microcomputer 127 advances to step S304. In step S304, the microcomputer 127 performs recording processing for recording an image file on a recording medium, which will also be described in detail below.

On the other hand, if it is determined in step S302 that the external recording medium 300 is in the power saving mode (YES in step S302), then the microcomputer 127 advances to step S305. In step S305, the microcomputer 127 recovers the external recording medium 300 from the power saving mode and performs mounting processing for enabling recording a file on the external recording medium 300. The mounting processing on the external recording medium 300 requires a long period of time. Accordingly, the microcomputer 127 performs the shooting processing in parallel with the shooting processing in step S303.

If it is determined in step S301 that the user has not instructed to start the shooting operation (NO in step S301), then the microcomputer 127 advances to step S306. In step S306, the microcomputer 127 determines whether the external recording medium 300 is in the power saving mode.

If it is determined in step S306 that the external recording medium 300 is in the power saving mode (YES in step S306), then the microcomputer 127 returns to step S301 to wait for a user instruction for starting a shooting operation. On the other hand, if it is determined in step S306 that the external recording medium 300 is not in the power saving mode (NO in step S306), then the microcomputer 127 advances to step S307. In step S307, the microcomputer 127 starts a timer for measuring a predetermined period of time.

The timer function (not illustrated) is provided to the microcomputer 127. When the user instructs a start of shooting during the measurement by the timer, the microcomputer 127 detects such a state in step S308, and starts the shooting processing. When the measured predetermined period of time has elapsed (YES in step S309), the microcomputer 127 advances to step S310. In step S310, the microcomputer 127 stops the power supply to the external recording medium 300 and thus the external recording medium 300 shifts to the power saving mode.

Now, the shooting processing will be described in detail below with reference to the flow chart of FIG. 4.

Figure 4:
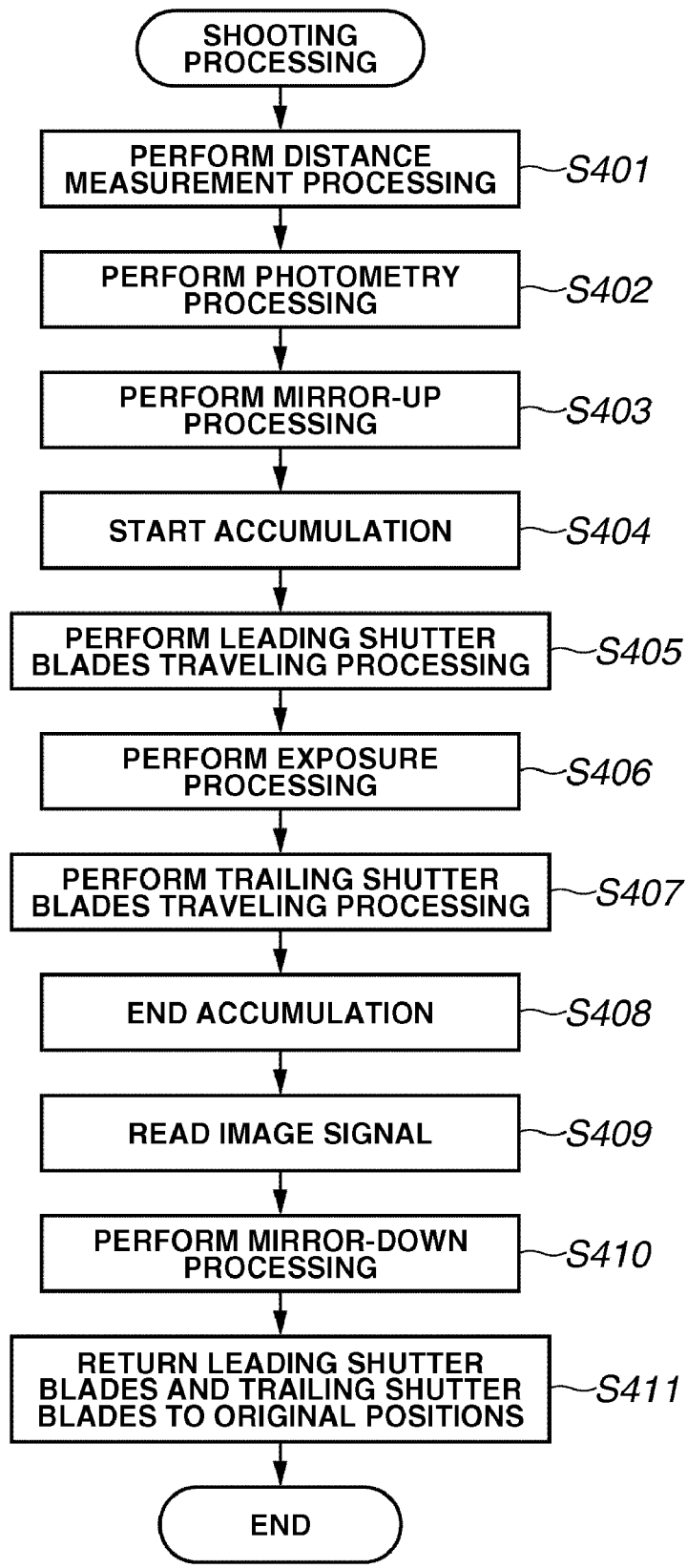
FIG. 4 is a flow chart illustrating an example of a shooting sequence according to the first exemplary embodiment of the present invention.

Referring to FIG. 4, after the shooting processing has started, in step S401, the microcomputer 127 performs an AF control operation with the distance measurement circuit 117 and the AF lens control circuit 101a to move the focusing lens to an in-focus position.

In step S402, the microcomputer 127 performs a photometry operation with the photometry circuit 118. Here, the microcomputer 127 determines a shutter control value and an aperture value according to the currently set shooting mode. After that, in step S403, the microcomputer 127 issues an instruction to the mirror control circuit 116 to perform a "mirror-up" operation for retracting the quick return mirror 102 to the outside of the shooting optical path.

In step S404, the microcomputer 127 starts an accumulation of charge on the image sensor 105. In step S405, the microcomputer 127 issues an instruction to the shutter control circuit 115 to move leading shutter blades, and then advances to step S406. In step S406, the microcomputer 127 performs the exposure processing.

In step S407, the microcomputer 127 issues an instruction to the shutter control circuit 115 to move trailing shutter blades. In step S408, the microcomputer 127 ends the accumulation of charge on the image sensor 105.

In step S409, the microcomputer 127 reads an image signal from the image sensor 105 and temporarily stores, in the memory 113, image data that has been processed by the A/D converter 106 and the image processing circuit 107. When all of the image signals have been completely read from the image sensor 105, the microcomputer 127 advances to step S410. In step S410, the microcomputer 127 performs a "mirror-down" operation for returning the quick return mirror 102 to the shooting optical path. In step S411, the microcomputer 127 issues an instruction to the shutter control circuit 115 to return the leading shutter blades and the trailing shutter blades to their original positions. Thus, a series of shooting processing has been completed.

It is necessary to specify a file name for a captured image data before starting the shooting operation. In the present exemplary embodiment, the file name has been specified during the mounting processing based on a current folder number Dc and a current file number Fc stored in the non-volatile memory 119. Accordingly, once the external recording medium 300 has been subjected to the mounting processing, the digital camera 100 can specify a file name for a captured image file and start a shooting operation without performing another mounting processing on the external recording medium 300, such as re-mounting processing after recovery from the power saving mode.

Figure 7:
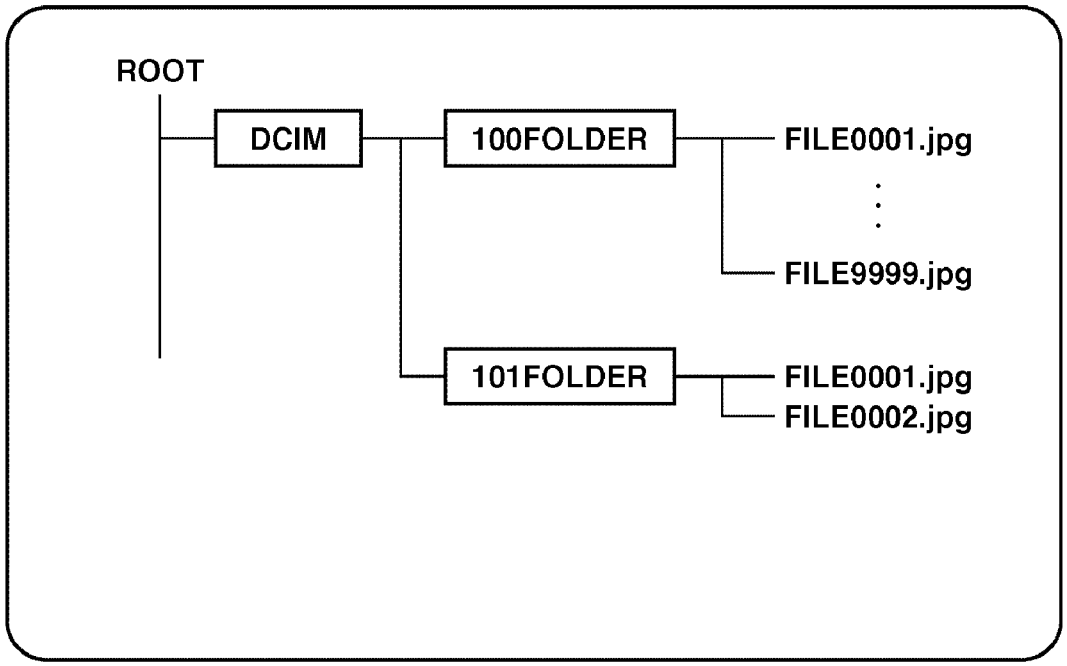
FIG. 7 schematically illustrates an example of a folder structure of a recording medium according to an exemplary embodiment of the present invention.

In the present exemplary embodiment, an external recording medium (HDD1) having a folder structure illustrated in FIG. 7 has been subjected to the mounting processing. Here, the current folder number Dc is "101" and the current file number Fc is "0002". Accordingly, a file number "0003" is assigned to a captured image file. Thus, a file having a file name "FILE0003.jpg" is generated and recorded in a folder having a folder name "101FOLDER" in the layer below the DCIM folder.

Figure 5:
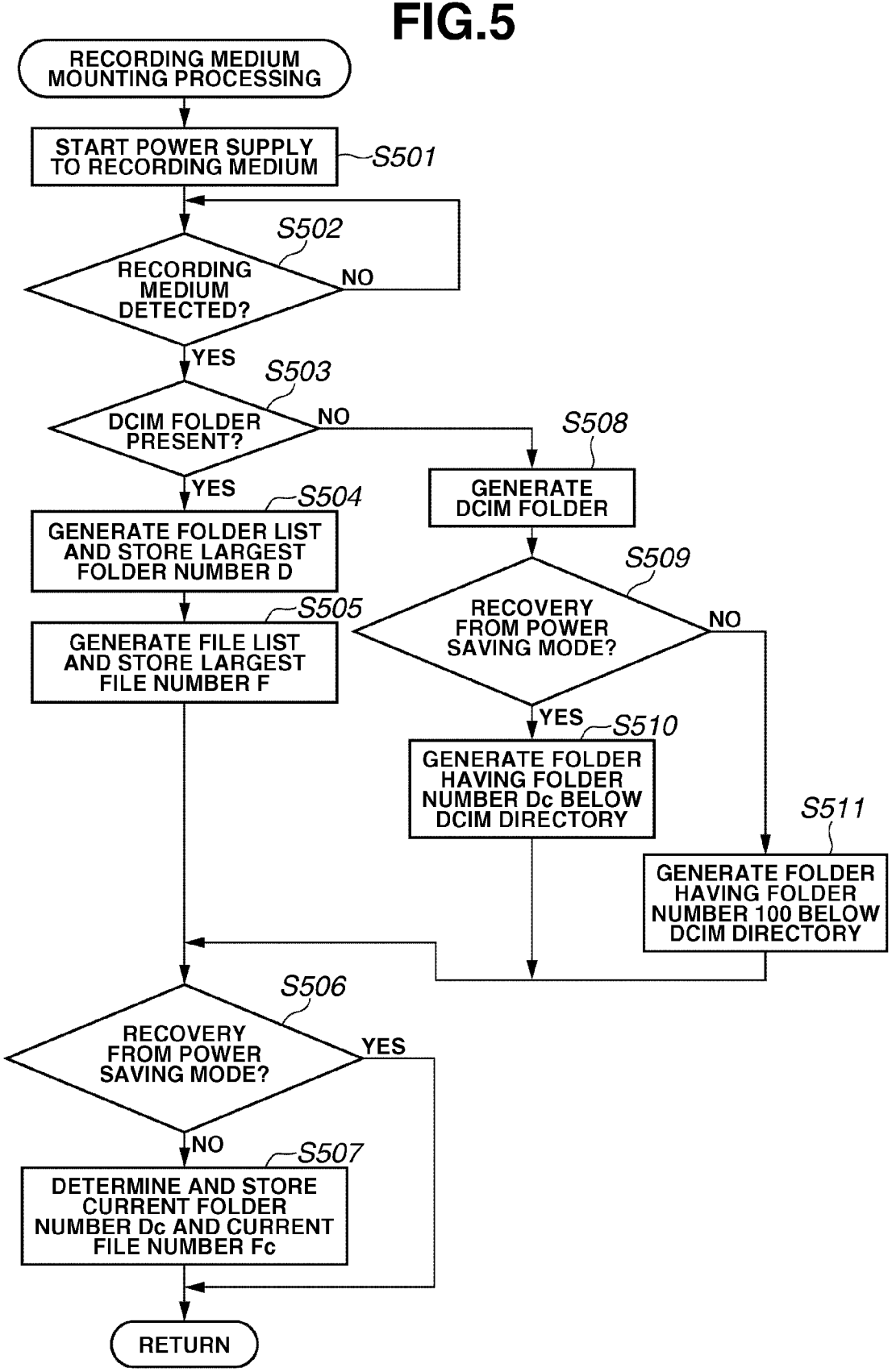
FIG. 5 is a flow chart illustrating an example of a mounting sequence according to the first exemplary embodiment of the present invention.

FIG. 5 is a flow chart illustrating an example of the mounting processing for making the external recording medium 300 usable according to the present exemplary embodiment.

Referring to FIG. 5, in step S501, the microcomputer 127 starts power supply to the external recording medium 300. In step S502, the microcomputer 127 detects whether the external recording medium 300 is connected.

If it is determined in step S502 that the external recording medium 300 has been connected (YES in step S502), then the microcomputer 127 advances to step S503. In step S503, the microcomputer 127 searches the directory below the root directory of the external recording medium 300 for a DCIM folder.

If a DCIM folder is found in step S503 (YES in step S503), then the microcomputer 127 advances to step S504. In step S504, the microcomputer 127 generates a list of folders based on a layer immediately below the DCIM folder and stores a largest folder number D from among the folder numbers of the existing folders.

In step S505, the microcomputer 127 refers to the folder list generated in step S504, generates a list of files based on a layer two layers below the DCIM folder, and stores a largest file number F from among the file numbers of the files existing in a layer immediately below the folder having the largest folder number D.

In step S506, the microcomputer 127 determines whether the external recording medium 300 is in the state after recovering from the power saving mode. If it is determined in step S506 that the external recording medium 300 is not in the state after recovering from the power saving mode (NO in step S506), then the microcomputer 127 advances to step S507. If it is determined in step S506 that the external recording medium 300 is in the state after recovering from the power saving mode (YES in step S506), then the microcomputer 127 ends the mounting processing.

In step S507, the microcomputer 127 determines that a new external recording medium 300 has been connected, and uses the largest folder number D and the largest file number F as the current folder number Dc and the current file number Fc, respectively, as information to be used for shooting. Then, the microcomputer 127 stores the current folder number Dc and the current file number Fc in the non-volatile memory 119. Then, the microcomputer 127 ends the mounting processing.

On the other hand, if no DCIM folder has been found in step S503 (NO in step S503), then the microcomputer 127 advances to step S508. In step S508, the microcomputer 127 generates a new DCIM folder below the root directory.

In step S509, the microcomputer 127 determines whether the external recording medium 300 is in the state after recovering from the power saving mode.

If it is determined in step S509 that the external recording medium 300 is in the state after recovering from the power saving mode (YES in step S509), then in step S510, the microcomputer 127 generates a folder having the folder number Dc stored in the non-volatile memory 119 in a layer immediately below the DCIM folder. For example, if the stored folder number Dc is "101", the microcomputer 127 generates a folder "101FOLDER".

On the other hand, if it is determined in step S509 that the external recording medium 300 is not in the state after recovering from the power saving mode (NO in step S509), then the microcomputer 127 advances to step S511. In step S511, the microcomputer 127 generates a folder having a folder number "100" in a layer below the DCIM folder.

After the folder is generated, the microcomputer 127 advances to step S507 after passing through step S506. In step S507, the microcomputer 127 uses the number of the generated folder as the current folder number Dc. Furthermore, the microcomputer 127 uses the stored file number as the current file number Fc. Moreover, a number (Fc+1) is used as the file number assigned to an image file during the shooting. Alternatively, such a configuration can be employed that if a new external recording medium 300 has been connected, the microcomputer 127 generates a folder "100FOLDER" regardless of the stored folder number Dc, and the folder number "100" is used as the current folder number Fc and the file number "0" is used as the current file number Fc.

A few seconds to several tens of seconds is required from the start of power supply to the external recording medium 300 to the time data can be written to the external recording medium 300. Accordingly, each processing is performed in parallel as a multi-task configuration. Thus, the shooting operation is completed before the time data can be written to the external recording medium 300.

Now, an example of a folder structure when an image file is recorded on an external recording medium according to the present exemplary embodiment will be described.

Figure 8:
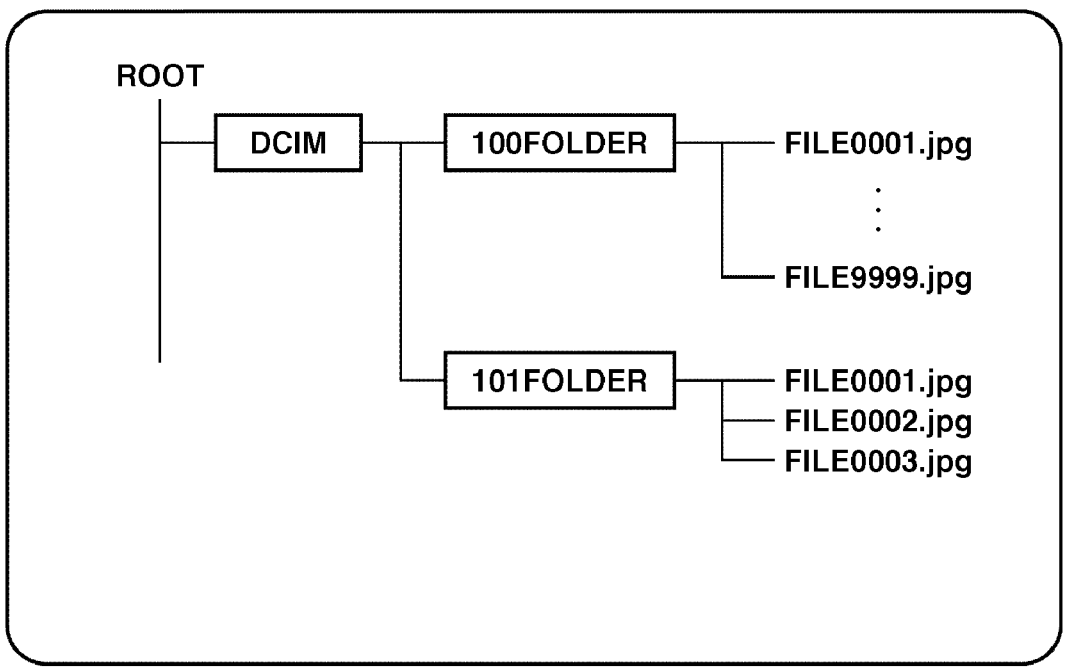
FIG. 8 schematically illustrates an example of a folder structure of a recording medium after storing a file according to an exemplary embodiment of the present invention.

When a file having a file name "FILE0003.jpg" is recorded on an external recording medium (HDD1) having the folder structure illustrated in FIG. 7, the folder structure of the external recording medium is changed to that illustrated in FIG. 8.

In FIG. 7, the folder "DCIM" is generated at the top of the directory. 9,999 files ("FILE0001.jpg" through "FILE9999.jpg"), which are image data, are generated in a layer immediately below the folder "100FOLDER" in the second layer. Furthermore, three files ("FILE0001.jpg", "FILE0002.jpg", and "FILE0003.jpg"), which are captured image data, are provided in a layer immediately below the second-layer folder "101FOLDER".

Hereinbelow, a case will be described where the external recording medium (HDD1) having the folder structure illustrated in FIG. 7 has been replaced with an external recording medium (HDD2) having the folder structure illustrated in FIG. 9 during the power saving mode of the external recording medium 300. It is to be noted that although not illustrated in FIG. 9, the recording medium in FIG. 9 (HDD2) includes folders having folder numbers "100" through "102", respectively, and each folder includes image files having file numbers "0001" through "9999", respectively.

If the external recording medium 300 has been replaced during the power saving mode of the external recording medium 300 or during the time the digital camera 100 has been powered off, the digital camera 100 cannot detect that the external recording medium 300 has been replaced. As described above, when the shooting operation starts, the microcomputer 127 determines the storage destination folder and the file name for a captured image data (file) based on the current folder number Dc and the current file number Fc stored in the non-volatile memory 119. Even in the case where the digital camera 100 cannot detect that the external recording medium 300 has been replaced as described above, that is, regardless of whether a replacement of the external recording medium 300 has been detected, the digital camera 100 performs a shooting operation while setting the current folder number Fc as "101" and the current file number Dc as "0002".

In this case, the folder number of the storage destination for a captured image file is "101" and the file number for the captured image file is "0003". The captured image file is stored as a file "FILE0003.jpg" stored in a folder "101FOLDER" in a layer below the DCIM folder. That is, the file path for the captured image file is "DCIM¥101FOLDER¥FILE0003.jpg".

Figure 9:
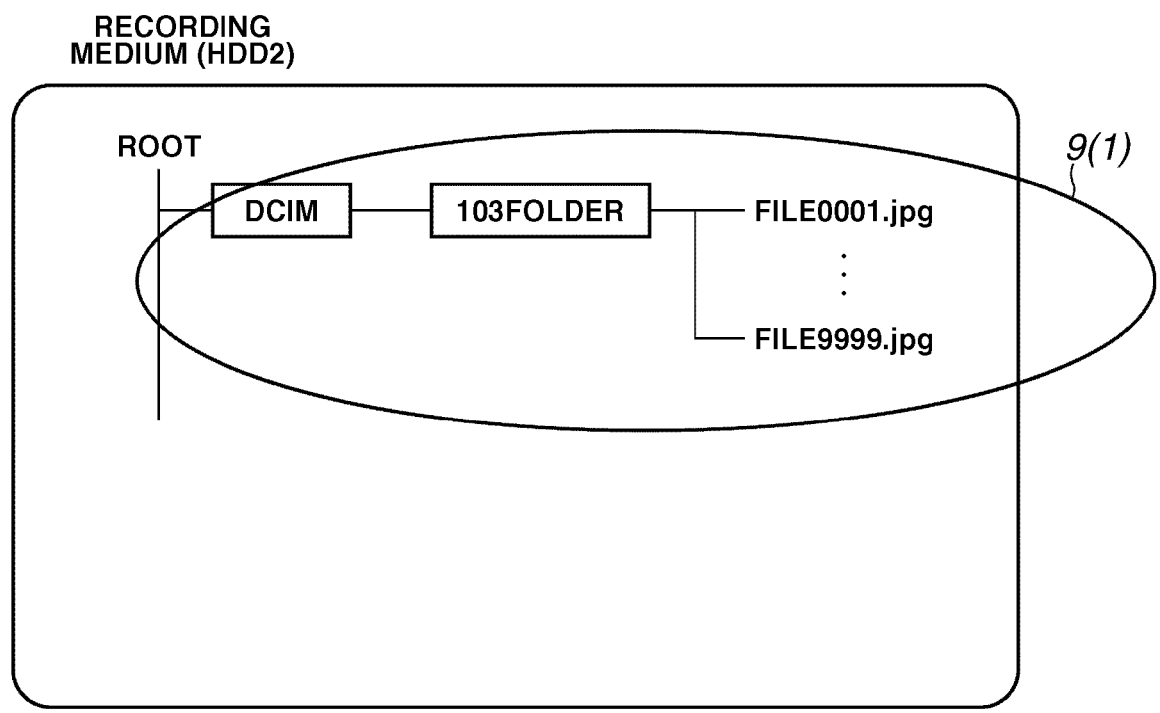
FIG. 9 schematically illustrates an example of another folder structure of a recording medium according to an exemplary embodiment of the present invention.
Figure 10:
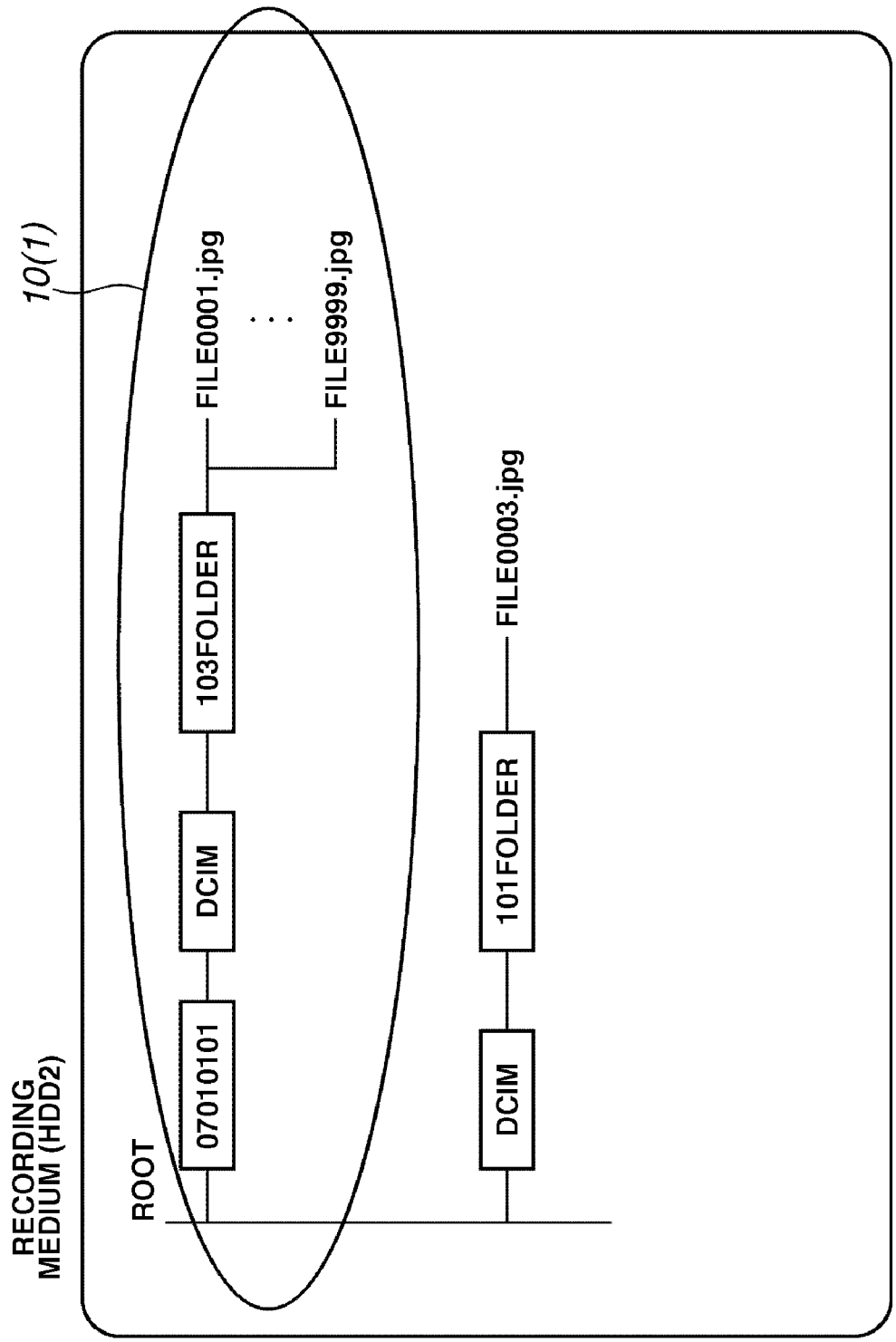
FIG. 10 schematically illustrates an example of a folder structure of another recording medium after storing a file according to an exemplary embodiment of the present invention.

In the example in FIG. 9, as indicated by a portion 9(1), the folder having the folder name "DCIM" is generated at the top of the directory. Furthermore, 9,999 files, which are image files, are generated in a layer immediately below the second layer folder "103FOLDER". When the captured image file is recorded as a file "FILE0003.jpg" in the storage destination folder "101FOLDER" on the external recording medium (HDD2) having the above-described folder structure, a new folder "A" is generated below the root directory. More specifically, the external recording medium 300 shifts to a folder structure indicated as a portion 10(1) in FIG. 10.

In the present exemplary embodiment, a folder "yymmddnn" is generated, which is generated below the root directory and has a folder name including a six-digit number "yymmdd" indicating a date of generation of the file and a two-digit serial number "nn" that is not the same as any other folder name. In the example illustrated in the portion 9(1) (FIG. 9), the date of generation of the file is Jan. 1, 2007. Accordingly, a folder having a folder name "07010101" is generated. If a folder "07010101" already exists, a folder "07010102", whose folder number (the serial number in the folder number) is different from the existing one, is generated.

When the folder "07010101" is generated one layer below the root directory, a "DCIM" folder is generated one layer below the folder "07010101", and a folder "103FOLDER" is generated in a layer immediately below the DCIM folder. Furthermore, 9,999 files ("FILE0001.jpg" through "FILE9999.jpg"), which are image data, are generated in a layer immediately below the folder "103FOLDER".

As described above, the DCIM folder and lower folders, which are indicated in the portion 9(1), are shifted to layers below the newly-generated top-layer folder "07010101" with the current folder structure maintained.

Furthermore, a new folder "101FOLDER", which has a current folder number Dc, is generated in a layer immediately below the DCIM folder, and the file "FILE0003.jpg" is recorded in a layer immediately below the folder "101FOLDER".

Now, processing for recording image data on the external recording medium 300 having the above-described folder structure will be described below with reference to the flow chart of FIG. 6.

Figure 6:
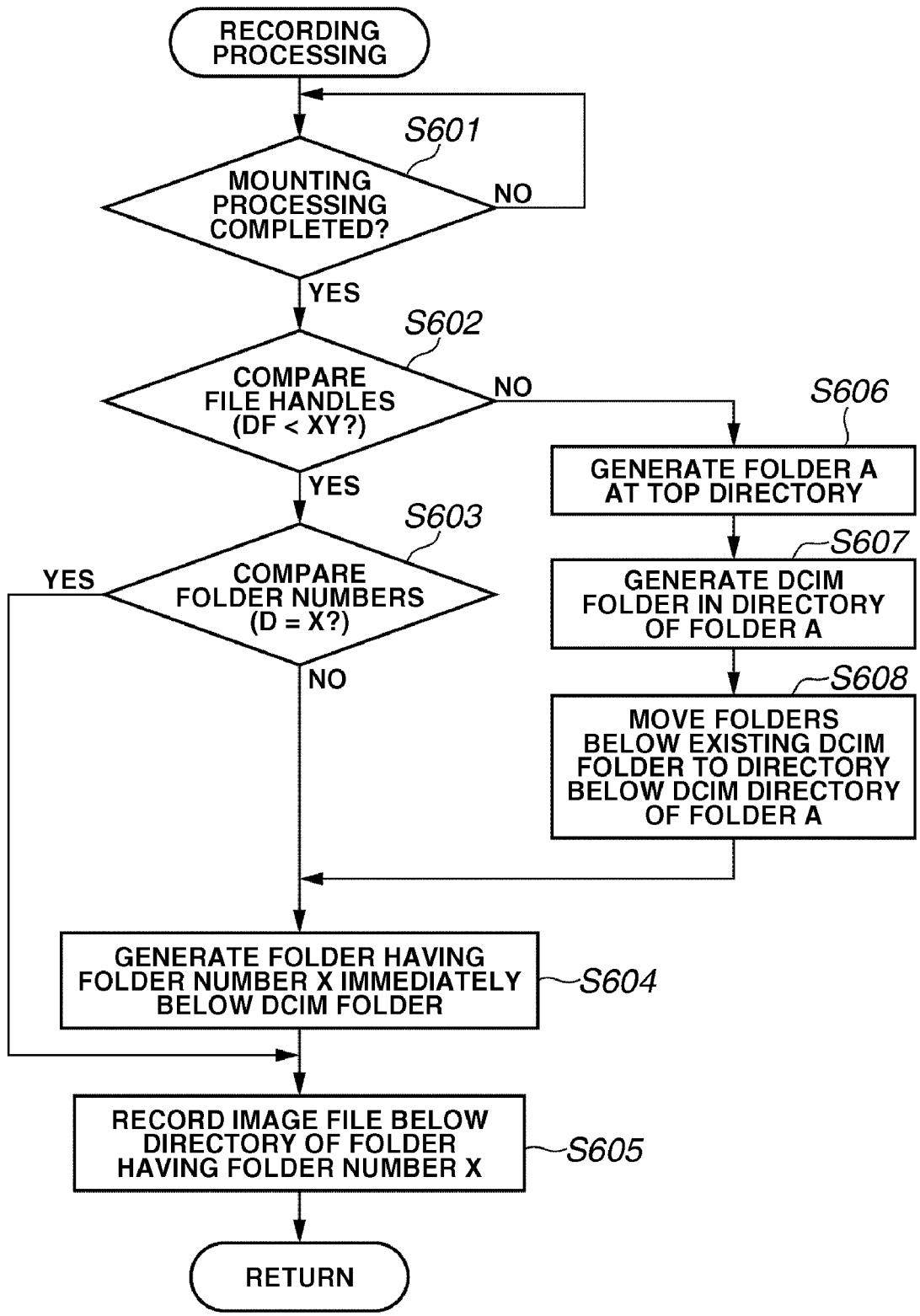
FIG. 6 is a flow chart illustrating an example of recording processing according to the first exemplary embodiment of the present invention.

Referring to FIG. 6, in step S601, the microcomputer 127 determines whether the mounting processing has been completed. If it is determined in step S601 that the mounting processing has not been completed, the microcomputer 127 waits until it is completed. When the mounting processing is completed, the microcomputer 127 advances to step S602.

In step S602, the microcomputer 127 compares a digit string (hereinafter referred to as a "file handle") DF with a file handle "XY". More specifically, the file handle DF is generated based on the first three digits D of the largest folder number D of the folders below the DCIM folder on the external recording medium 300 and the last four digits of the largest file number F. The file handle XY includes the first three digits of the storage folder number X of the storage folder for the image file to be recorded and the last four digits of the file number Y of the image file to be recorded.

Here, the file handle DF is "1010003", based on the folder "101FOLDER" and the file "FILE0003.jpg". The file handle DF is "1010002", based on the largest folder number D "101" and the largest file number F "0002", in the case of the external recording medium 300 having the folder structure in FIG. 7. In the case of the external recording medium 300 having the folder structure in FIG. 9, the file handle DF is "1039999".

If, as a result of the comparison in step S602, it is determined that the file handle DF is smaller than the file handle XY (YES in step S602), the microcomputer 127 advances to step S603. In the example of FIG. 7, the file handle DF is "101002" and the file handle XY is "1010003". In this case, the microcomputer 127 advances to step S603.

In step S603, the microcomputer 127 compares the largest folder number D of the folders below the DCIM folder on the external recording medium 300 with the storage folder number X of the folder for storing the image file to be recorded. If it is determined in step S603 that the folder numbers D and X are identical to each other (YES in step S603), then the microcomputer 127 advances to step S605.

On the other hand, if it is determined in step S603 that the folder numbers D and X differ from each other (NO in step S603), then the microcomputer 127 advances to step S604. In step S604, the microcomputer 127 generates a folder having a folder number X in a layer immediately below the DCIM folder. In step S605, the microcomputer 127 records an image file below the layer of the folder having the folder number X. Then, the recording processing ends. In the case of the external recording medium 300 having the folder structure in FIG. 7, the file "FILE0003.jpg" is recorded in the folder "101FOLDER" below the DCIM folder, and the folder structure of the external recording medium 300 in this case is changed to the folder structure illustrated in FIG. 8.

On the other hand, if it is determined in step S602 that the file handle XY is equal to or smaller than the file handle DF (NO in step S602), then the microcomputer 127 advances to step S606. In the case of the example in FIG. 9, the file handle DF is "1039999" and the file handle XY is "1010003". In this case, the microcomputer 127 advances to step S606.

In step S606, the microcomputer 127 generates a new folder "A" below the top layer. In the present exemplary embodiment, as described above, the microcomputer 127 generates a folder having a folder number generated based on the six-digit number "yymmdd" for identifying the date of generation of the folder and a two-digit serial number that is not the same as any other folder name. In the example in FIG. 10, a folder "07010101" is generated.

In step S607, the microcomputer 127 generates a DCIM folder below the layer of the generated folder A. Then, the microcomputer 127 advances to step S608. In step S608, the microcomputer 127 moves the DCIM folder and lower folders, which have been generated below the top layer, and all of the files included in the DCIM folder and lower folders to the directory below the DCIM folder generated below the folder A, without changing the folder structure (the folder names and the file names). In the example in FIG. 10, the folder "103FOLDER" below the DCIM folder (9(1) in FIG. 9) is moved to the layer below the DCIM folder that is below the folder "07010101" (10(1) in FIG. 10).

Thus, the microcomputer 127 records, on the external recording medium 300, an image file generated as a file having a file name assigned based on the current folder number Dc and the current file number Fc by the shooting operation, as described above.

More specifically, if a folder having a folder number greater than the current folder number Dc is previously recorded on the external recording medium 300, or if a file having a file name including a file number equal to or greater than a file number defined by an expression "((current file number Fc)+1)" is previously recorded on the external recording medium 300, then the microcomputer 127 changes the path of the existing folder structure to the layer below the newly generated folder without changing the existing folder structure of the DCIM folder and lower folders. Furthermore, the microcomputer 127 generates a new folder having the current folder number Fc and records a captured image file in a layer immediately below the newly generated folder with a new path for the file.

According to the folder naming regulation for generating a folder name in step S606, ninety-nine folders can be generated at a maximum. If the same folder number has been already used for the existing folder and a new folder having the same folder number cannot be generated, then the microcomputer 127 can issue a warning message to the user notifying so.

In the present exemplary embodiment, an image file is recorded on the external recording medium 300. However, the present invention can be implemented by a digital camera that can selectively use the external recording medium 300 and the memory card 200 and has a double recording mode for recording the same image file on two recording media at the same time.

In the case where the present invention is applied to such a digital camera, even if the external recording medium 300 is changed from an external recording medium having the folder structure in FIG. 7 to an external recording medium having the folder structure in FIG. 9 in the power saving mode of the external recording medium 300, an image file is recorded in the same path for both the memory card and the external recording medium during the double recording mode. Accordingly, the consistency and the integrity of the file names can be maintained between different recording media.

As described above, according to the present exemplary embodiment, even when the external recording medium 300 is in the power saving mode, a shooting operation can be performed before the completion of the mounting processing on the external recording medium 300, using information stored in the non-volatile memory 119.

Furthermore, in the case of recording an image file on the external recording medium, the microcomputer 127 checks whether the file number of the file recorded on the external recording medium and the file number of the file to be recorded overlap each other. Accordingly, it can be prevented that the user overwrites an image file by mistake when an external recording medium is replaced during the power saving mode.

Moreover, it can be prevented that the file names of the same files recorded on different recording media differ from each other during a double recording mode, in which the same image file is recorded on two recording media at the same time.

Accordingly, the present exemplary embodiment can implement an image pickup apparatus having a high response capability and a high reliability, even in the case where an external recording medium that requires a long period of time to be ready for use is used.

Second Exemplary Embodiment

Now, a second exemplary embodiment of the present invention will be described below. In the present exemplary embodiment, an expansion apparatus 400, which is an externally-connected apparatus configured to provide an expanded function, is connected to a digital camera (image pickup apparatus) 100'. This is a point of difference from the digital camera 100 of the first exemplary embodiment. In the present exemplary embodiment, the expansion apparatus 400 enables the digital camera 100' to record an image file on an external recording medium.

Figure 11:
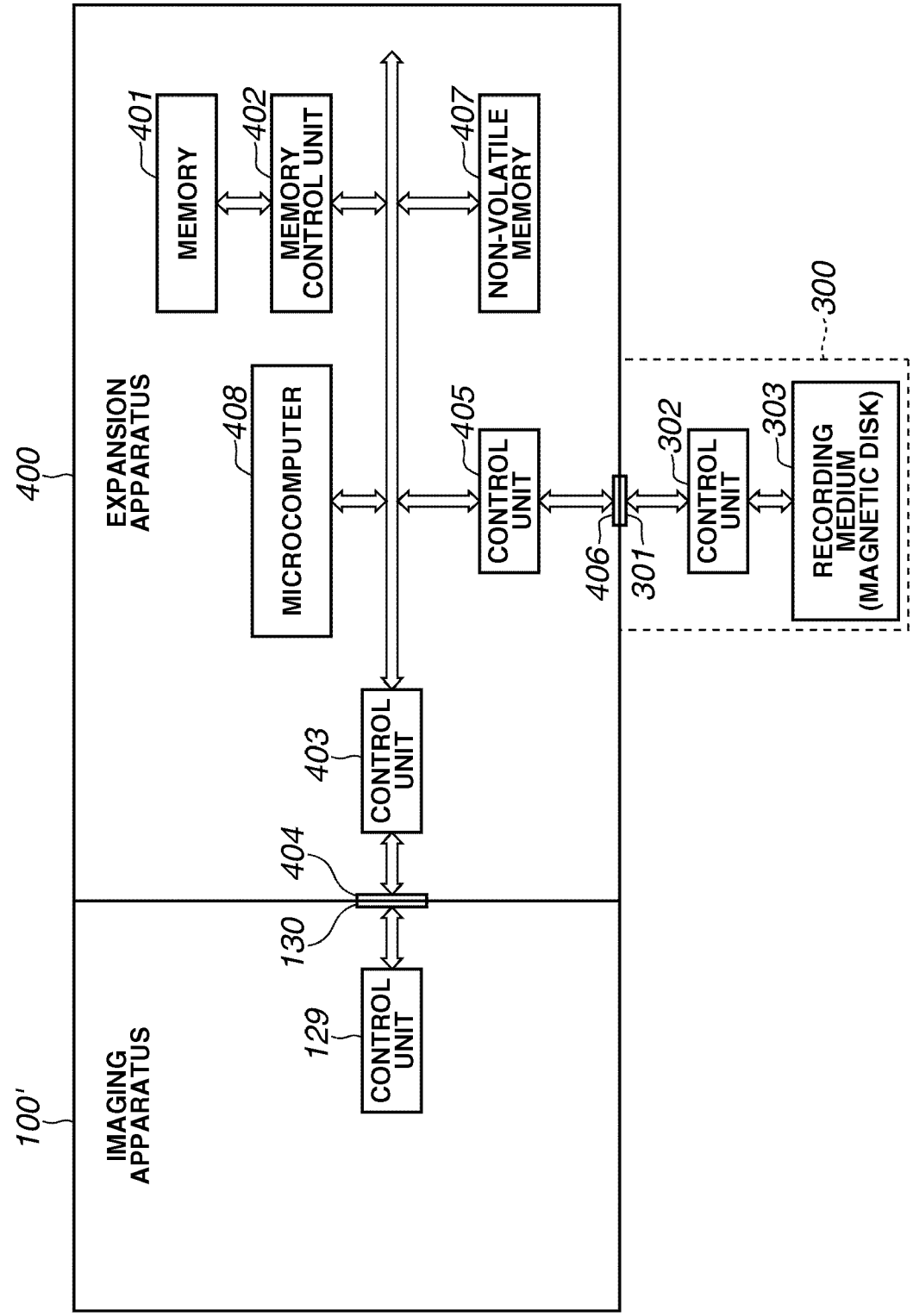
FIG. 11 illustrates an example of a functional configuration of an image pickup apparatus according to a second exemplary embodiment of the present invention.

FIG. 11 illustrates an example of a configuration of an interchangeable-lens digital camera according to the second exemplary embodiment of the present invention. Referring to FIG. 11, the digital camera 100' has a configuration similar to that of the digital camera (image pickup apparatus) 100 (FIG. 1). In addition to the components similar to that of the digital camera 100 (FIG. 1), the digital camera 100' includes a function for communicating with the expansion apparatus 400. In this regard, the digital camera 100' includes a serial communication control unit 129, which is an interface with the expansion apparatus 400 and used for sending and receiving a command and data between the expansion apparatus 400 and the digital camera 100'. In addition, the digital camera 100' includes a connector 130 for connecting the expansion apparatus 400 with the digital camera 100'.

The expansion apparatus 400 has the following configuration. The expansion apparatus 400 includes a memory 401, which includes an image buffer area for temporarily storing image data from the digital camera 100' and a work buffer area for storing data that the expansion apparatus 400 temporarily uses. A memory control circuit 402 controls the memory 401. A serial communication control unit 403 is an interface with the digital camera 100' and is used for sending and receiving a command and data between the expansion apparatus 400 and the digital camera 100'. A connector 404 connects the expansion apparatus 400 with the digital camera 100'. A control unit 405 controls an external recording medium, such as an HDD. A connector 406 connects the external recording medium, such as an HDD, to the digital camera 100'.

A microcomputer 408 controls the expansion apparatus 400 having the above-described configuration. A non-volatile memory 407 stores various programs, such as a program for communicating with the digital camera 100' via the serial communication control unit 403, various programs for recording, on the external recording medium 300, image file data sent from the digital camera 100' via the serial communication control unit 403, various programs such as an OS for implementing and executing the multi-task configuration of the above-described programs. Furthermore, the non-volatile memory 407 stores an adjustment value for performing various control operations.

In the present exemplary embodiment, the control unit 405 includes a host controller for implementing a function of the expansion apparatus 400 as a host device for the USB-connected peripheral device. The connector 406 is provided on the housing of the expansion apparatus 400. A USB cable (not illustrated) can be inserted in the connector 406 for connecting with the external recording medium 300 via the USB cable. The external recording medium 300 can be supplied with power via the USB cable. Here, the external recording medium 300 consumes a very large amount of power. Accordingly, the expansion apparatus 400 includes a power saving mode for stopping power supply to the external recording medium 300 based on a result of a predetermined determination operation.

Now, an operation of the digital camera 100' having the above-described configuration will be described below with reference to the flow chart of FIG. 12. The shooting operation of the digital camera 100' is similar to the shooting operation of the digital camera 100 (FIG. 1). Accordingly, the description thereof will not be repeated here.

Figure 12:
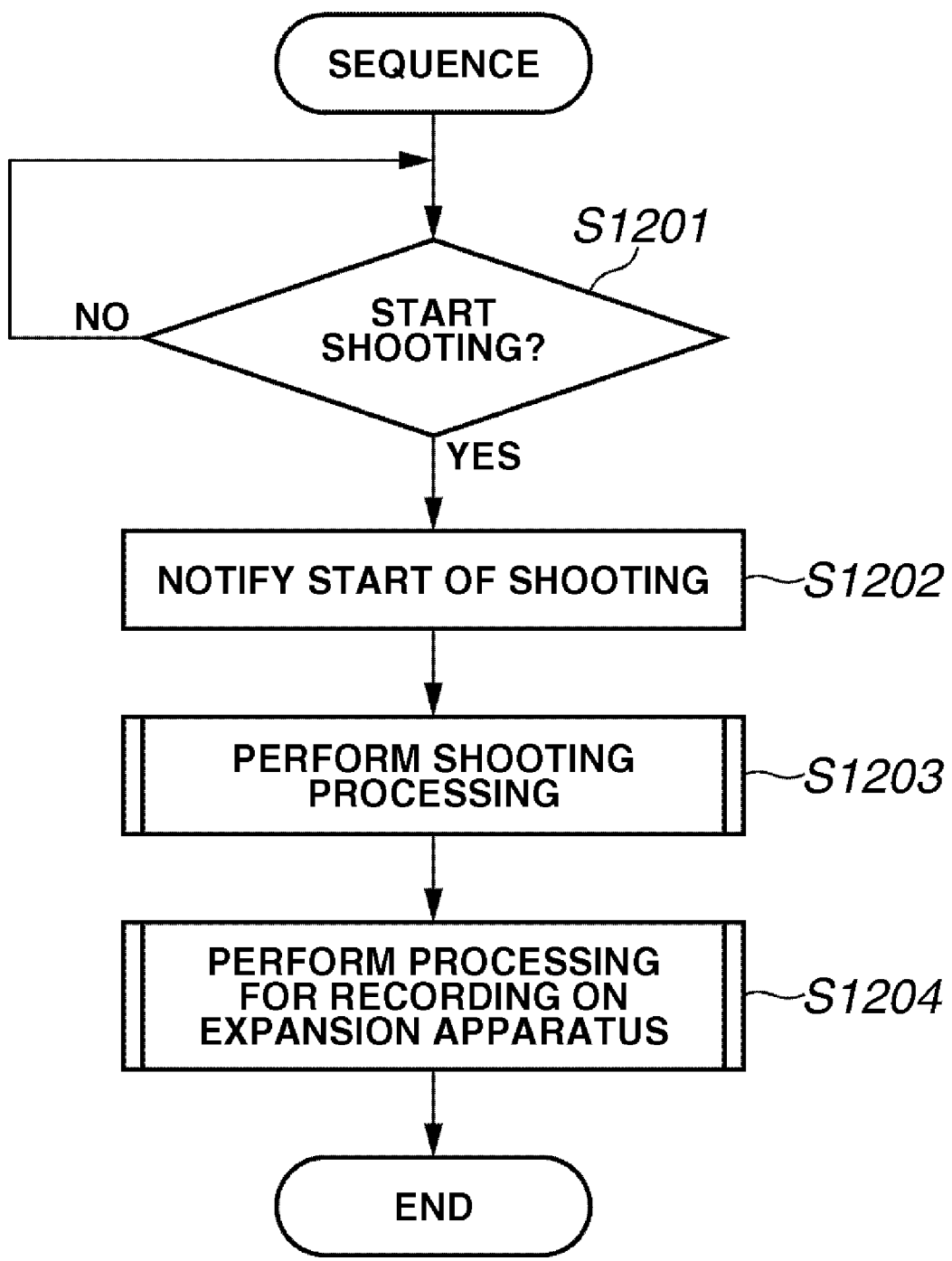
FIG. 12 is a flow chart illustrating an example of a main sequence performed by the image pickup apparatus according to the second exemplary embodiment of the present invention.

FIG. 12 is a flow chart illustrating an example of a main sequence performed by the digital camera 100' according to the present exemplary embodiment. More specifically, FIG. 12 particularly illustrates processing from the shooting operation to the recording operation. Each processing described with reference to the flow chart of FIG. 12 can be performed with a multi-task configuration.

Referring to FIG. 12, in step S1201, the digital camera 100' determines whether the user has operated the release switch 120 to issue an instruction for starting a shooting operation. If it is determined in step S1201 that the user has operated the release switch 120 to issue an instruction for starting a shooting operation (YES in step S1201), then the microcomputer 408 advances to step S1202. In step S1202, the digital camera 100' notifies the expansion apparatus 400 that the user has issued the instruction for starting a shooting operation. The operation of the expansion apparatus 400 after receiving the notification from the digital camera 100' will be described in detail below. In step S1203, the digital camera 100' performs shooting processing. After the shooting operation in step S1203 is completed, the processing advances to step S1204. In step S1204, the digital camera 100' requests the expansion apparatus 400 to perform processing for recording an image file on the external recording medium 300. The recording processing will also be described in detail below.

Figure 13:
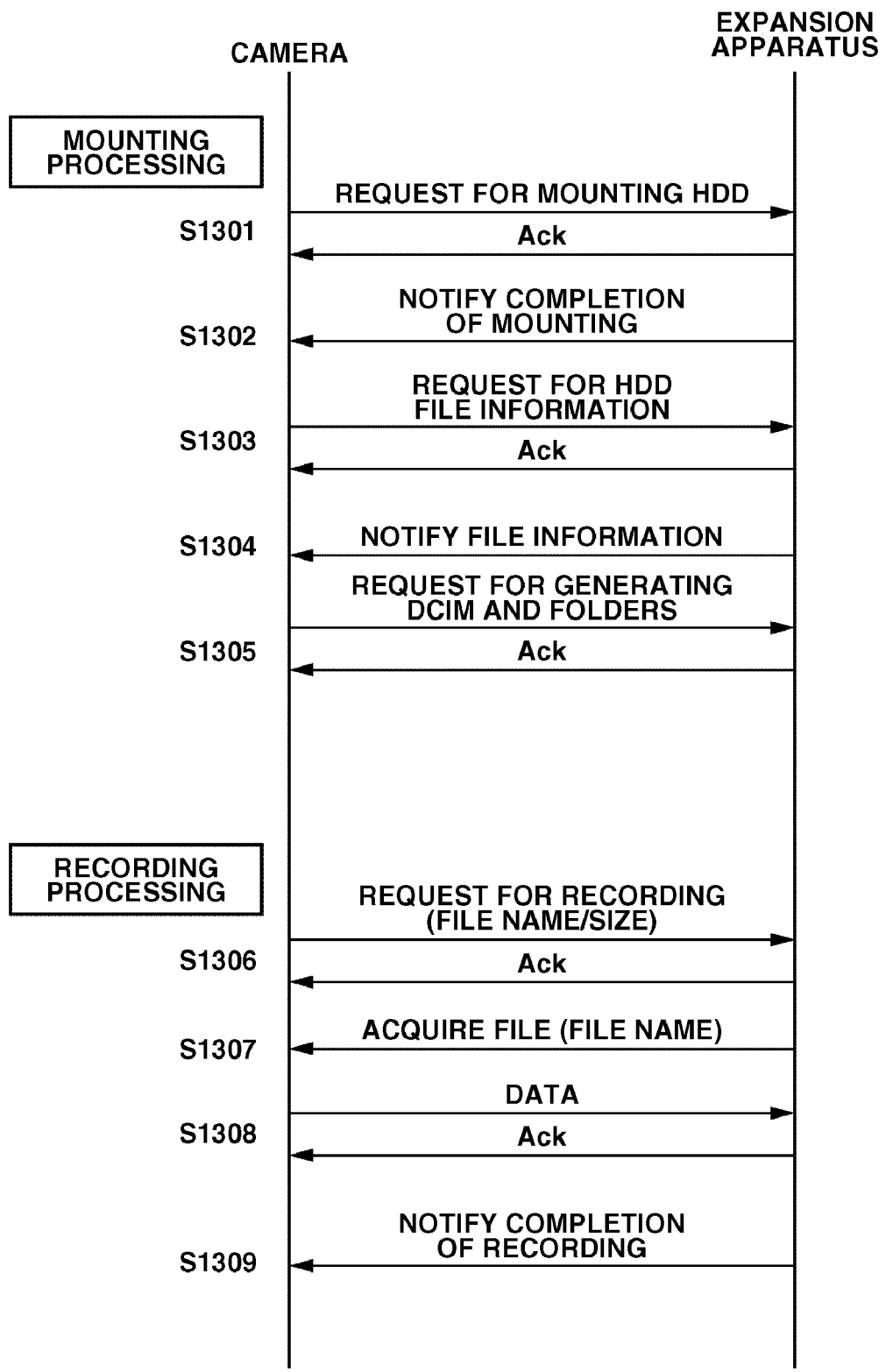
FIG. 13 illustrates an example of a sequence performed by the image pickup apparatus and an expansion apparatus according to the second exemplary embodiment of the present invention.

FIG. 13 illustrates an example of a sequence for the mounting processing performed to make the external recording medium 300 ready for use and processing performed by the digital camera 100' and the expansion apparatus 400 during the recording processing according to the present exemplary embodiment.

When the external recording medium 300 is used for the first time, it is necessary to perform mounting processing for making the external recording medium 300 usable. Here, the sequence for the mounting processing will be described below.

Referring to FIG. 13, after the digital camera 100' has requested the expansion apparatus 400 for a connection status of the external recording medium 300, in step S1301, the expansion apparatus 400 sends to the digital camera 100' an acknowledgement (ACK) (response) to the digital camera 100', in response to the request for the connection status of the external recording medium 300 from the digital camera 100'.

In step S1302, the expansion apparatus 400 starts power supply to the external recording medium 300 and detects whether any external recording medium 300 is connected. If it is determined in step S1302 that an external recording medium 300 is connected, then the expansion apparatus 400 sends a notification of the connection status of the external recording medium 300 to the digital camera 100'.

In step S1303, the digital camera 100' sends to the expansion apparatus 400 a request for information about a file stored on the external recording medium 300. The expansion apparatus 400, after receiving the request from the digital camera 100', sends an ACK to the digital camera 100'.

In step S1304, the expansion apparatus 400, after receiving the request for file information, generates information about the file stored on the external recording medium 300 and sends the generated file information to the digital camera 100'. The digital camera 100' generates a file list according to the received file information and determines the current folder number Dc and the current file number Fc.

If it is determined that no DCIM folder exists below the root directory of the external recording medium 300, then the processing advances to step S1305. In step S1305, the digital camera 100' sends a request for generating a new DCIM folder below the root directory and generating a folder having the folder number Dc, which is stored in the non-volatile memory 119, in a layer immediately below the DCIM folder. The expansion apparatus 400, after receiving the request from the digital camera 100', generates a DCIM folder and a folder having the folder number Dc and sends an ACK to the digital camera 100'.

Figure 14:
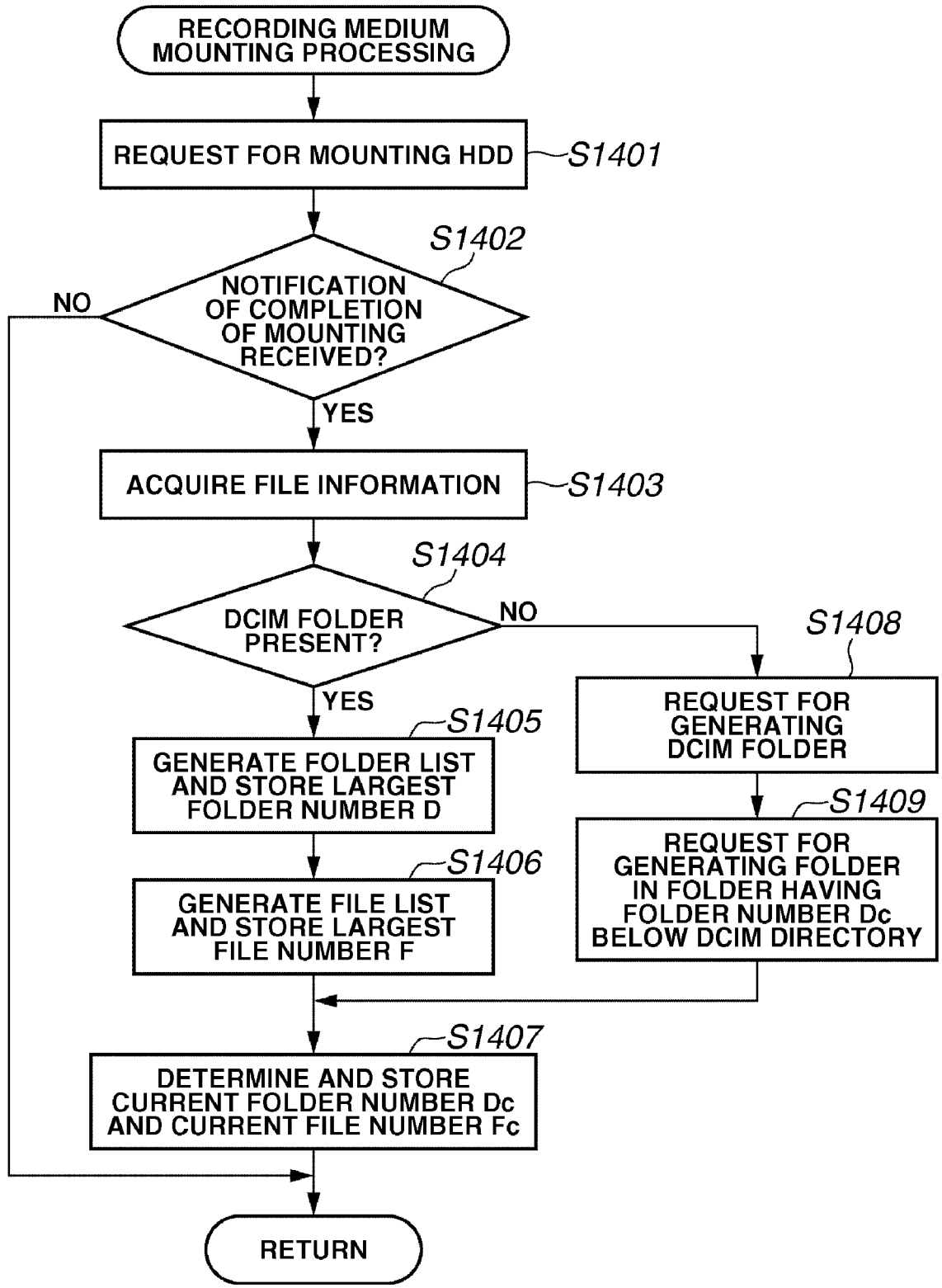
FIG. 14 is a flow chart illustrating an example of a mounting sequence according to the second exemplary embodiment of the present invention.

FIG. 14 is a flow chart illustrating an example of the mounting processing performed by the digital camera 100' for making the external recording medium 300 usable according to the present exemplary embodiment.

Referring to FIG. 14, in step S1401, the digital camera 100' issues a request to the expansion apparatus 400 for connection of the external recording medium 300. In step S1402, the digital camera 100' determines whether a notification of completion of connection of the external recording medium 300 has been received. If it is determined in step S1402 that notification of completion of connection of the external recording medium 300 has been received (NO in step S1402), then the mounting processing ends. On the other hand, if it is determined in step S1402 that a notification of completion of connection of the external recording medium 300 has been received (YES in step S1402), then in step S1403, the digital camera 100' acquires file information about the file stored on the external recording medium 300.

In step S1404, the digital camera 100' searches the directory below the root directory of the external recording medium 300 for a DCIM folder.

If a DCIM folder is found (YES in step S1404), then the processing advances to step S1405. In step S1405, the digital camera 100' generates a list of folders based on a layer immediately below the DCIM folder and stores a largest folder number D from among the folder numbers of the generated folders.

In step S1406, the digital camera 100' refers to the folder list generated in step S1405, generates a list of files based on a layer two layers below the DCIM folder, and stores a largest file number F from among the file numbers of the files existing in a layer immediately below the folder having the folder number D.

In step S1407, the digital camera 100' uses the largest folder number D and the largest file number F as the current folder number Dc and the current file number Fc, respectively, as information to be used for shooting. Then, the digital camera 100' stores the current folder number Dc and the current file number Fc in the non-volatile memory 119.

On the other hand, if no DCIM folder has been found in step S1404 (NO in step S1404), then the processing advances to step S1408. In step S1408, the digital camera 100' issues a request to the expansion apparatus 400 for generating a new DCIM folder below the root directory.

In step S1409, the digital camera 100' sends a request to the expansion apparatus 400 for generating a folder having the folder number Dc, which is stored in the non-volatile memory 119, in a layer immediately below the DCIM folder.

In this case, if the stored folder number Dc is "101", a folder "101FOLDER" is generated.

After generating the folder, the processing advances to step S1407. In step S1407, the digital camera 100' uses the number of the generated folder as the current folder number Dc, and uses the number of the stored file as the current file number Fc. Moreover, a number (Fc+1) is used as the file number assigned to an image file during the shooting.

Before the mounting processing on the external recording medium 300 ends, the digital camera 100' has not yet recognized the folder structure of the external recording medium 300. Accordingly, no captured image data can be written on the external recording medium 300 because the digital camera 100' cannot assign a file number to the image file.

Figure 15:
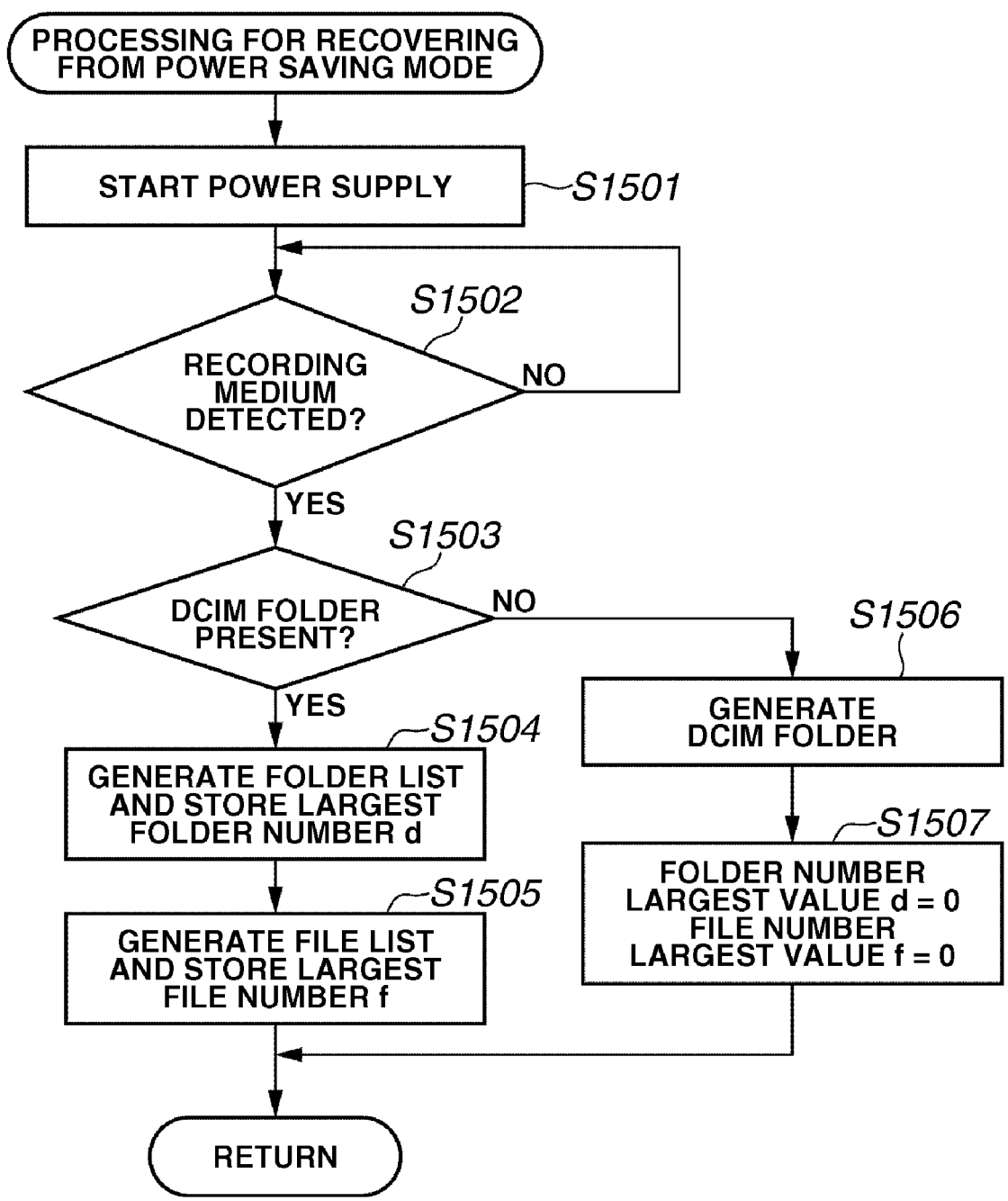
FIG. 15 is a flow chart illustrating an example of processing for recovering from a power saving mode of an external recording medium according to the second exemplary embodiment of the present invention.

FIG. 15 is a flow chart illustrating an example of processing performed by the expansion apparatus 400 when the expansion apparatus 400 has received a notification of starting a shooting operation from the digital camera 100' according to the present exemplary embodiment. More specifically, FIG. 15 is a flow chart illustrating an example of processing for recovering from the power saving mode of the external recording medium 300 to make the external recording medium 300 ready for use according to the present exemplary embodiment.

In the present exemplary embodiment, if the expansion apparatus 400 determines that no access to the external recording medium 300 has been made from the digital camera 100' for a predetermined length of time, then the expansion apparatus 400 stops power supply to the external recording medium 300 and shifts the external recording medium 300 to the power saving mode.

Referring to FIG. 15, in step S1501, the expansion apparatus 400 starts power supply to the external recording medium 300. In step S1502, the expansion apparatus 400 detects whether an external recording medium 300 has been connected.

If it is determined in step S1502 that an external recording medium 300 has been connected (YES in step S1502), then the processing advances to step S1503. In step S1503, the expansion apparatus 400 searches the directory below the root directory of the external recording medium 300 for a DCIM folder.

If a DCIM folder is found in step S1503 (YES in step S1503), then the processing advances to step S1504. In step S1504, the expansion apparatus 400 generates a list of folders based on a layer immediately below the DCIM folder and stores on the memory 401 a largest folder number D from among the folder numbers of the generated folders.

In step S1505, the expansion apparatus 400 refers to the folder list generated in step S1504 and generates a list of files based on a layer two layers below the DCIM folder. Furthermore, the expansion apparatus 400 stores a largest file number F from among the file numbers of the files existing in a layer immediately below the folder having the folder number d. Then, the processing for recovering from the power saving mode ends.

On the other hand, if no DCIM folder has been found in step S1503 (NO in step S1503), then the processing advances to step S1506. In step S1506, the expansion apparatus 400 generates a new DCIM folder below the root directory.

In step S1507, the expansion apparatus 400 sets a value "0" to the largest folder number D and the largest file number F. Then, the processing for recovering from the power saving mode ends.

Here, the digital camera 100' can continue performing shooting processing in parallel to the processing for recovering from the power saving mode by the expansion apparatus 400.

Now, referring back to FIG. 13, the sequence for the recording processing performed by the digital camera 100' and the expansion apparatus 400 will be described.

First, in step S1306, the digital camera 100' notifies the expansion apparatus 400 of the file name and the file size of an image file to be recorded on the external recording medium 300 and requests the expansion apparatus 400 to record the image file.

After receiving the request for recording, in step S1306, the expansion apparatus 400 secures a memory area on the memory 401 of a size large enough to record the requested image file, and then sends an ACK (response) to the digital camera 100'.

In step S1307, after receiving the request for recording from the digital camera 100', the expansion apparatus 400 sends a notification to the digital camera 100' of a start of acquisition of the image file to be recorded.

In response to the notification of the start of acquisition of the image file to be recorded sent from the expansion apparatus 400, in step S1308, the digital camera 100' sends to the expansion apparatus 400 the data (the image file to be recorded). When the expansion apparatus 400 has received the data from the digital camera 100', the expansion apparatus 400 sends an ACK to the digital camera 100'.

In step S1309, when the expansion apparatus 400 has completely recorded the image file on the external recording medium 300, the expansion apparatus 400 sends a notification of completion of the recording to the digital camera 100'. Then, a series of recording processing ends. The digital camera 100' and the expansion apparatus 400 repeat the processing in steps S1306 through S1309 in recording image files captured by subsequent shooting operations on the external recording medium 300.

Now, the recording processing by the digital camera 100', more specifically, the recording processing by the digital camera 100' for recording an image file on the external recording medium 300 having the folder structure similar to that in the first exemplary embodiment (FIG. 7 and FIG. 9), for example, will be described in detail below with reference to the flow chart of FIG. 16.

Figure 16:
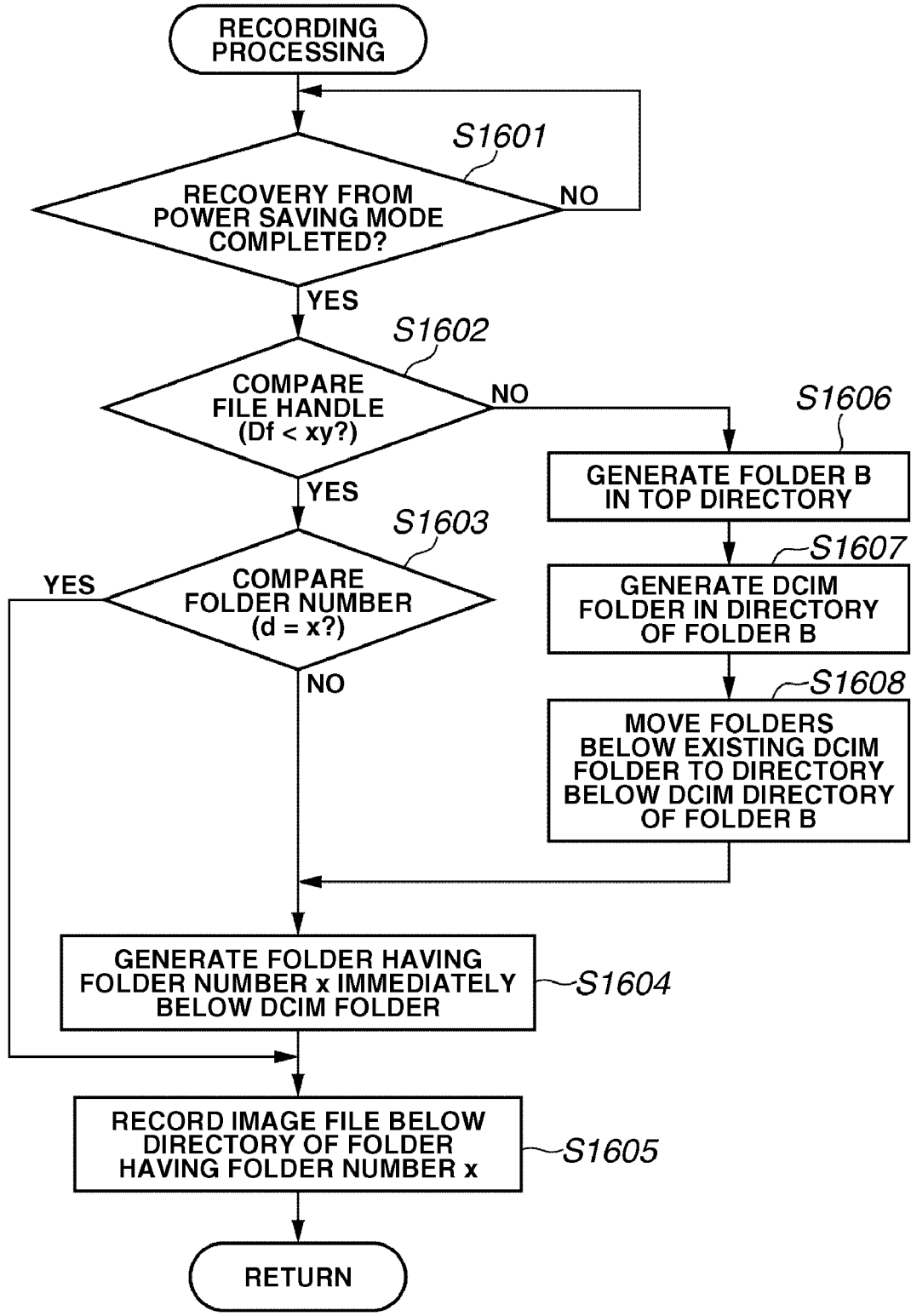
FIG. 16 is a flow chart illustrating an example of recording processing according to the second exemplary embodiment of the present invention.

Referring to FIG. 16, in step S1601, the digital camera 100' determines whether the processing for recovering from the power saving mode has been completed. If it is determined in step S1601 that the processing for recovering from the power saving mode has not been completed (NO in step S1601), the digital camera 100' waits until it is completed. When the processing for recovering from the power saving mode is completed (YES in step S1601), the processing advances to step S1602.

In step S1602, the microcomputer 408 compares a file handle "Df" with a file handle "xy". More specifically, the file handle Df includes the first three digits of the largest folder number D of the folders below the DCIM folder on the external recording medium 300 and the last four digits of the largest file number F. The file handle xy includes the first three digits of the storage folder number x of the storage folder for the image file to be recorded based on the request for recording by the digital camera 100' and the last four digits of the file number y of the image file to be recorded based on the request for recording by the digital camera 100'.

As a result of the comparison in step S1602, if it is determined that the file handle Df is smaller than the file handle xy (YES in step S1602), the processing advances to step S1603. In the example in FIG. 7, the file handle Df is "101002" and the file handle xy is "1010003". In this case, the processing advances to step S1603.

In step S1603, the digital camera 100' compares the largest folder number D of the folders below the DCIM folder on the external recording medium 300 with the storage folder number x of the folder for storing the image file to be recorded. If it is determined in step S1603 that the folder numbers are identical to each other (YES in step S1603), then the processing advances to step S1605.

On the other hand, if it is determined in step S1603 that the folder numbers d and x differ from each other (NO in step S1603), then the processing advances to step S1604. In step S1604, the digital camera 100' generates a folder having a folder number x in a layer immediately below the DCIM folder. In step S1605, the digital camera 100' records an image file below the layer of the folder having the folder number x. Then, the recording processing ends. In the case of the external recording medium 300 having the folder structure in FIG. 7, the file "FILE0003.jpg" is recorded in the folder "101FOLDER" below the DCIM folder, and the folder structure of the external recording medium 300 in this case is changed to the folder structure illustrated in FIG. 8.

On the other hand, if it is determined in step S1602 that the file handle xy is equal to or smaller than the file handle Df (NO in step S1602), then the processing advances to step S1606. In the case of the example in FIG. 9, the file handle Df is "1039999" and the file handle xy is "1010003". In this case, the processing advances to step S1606.

In step S1606, the digital camera 100' generates a new folder "B" below the top layer. In the present exemplary embodiment, similar to the case of the first exemplary embodiment, the digital camera 100' generates a folder having a folder number generated based on the six-digit number "yymmdd" for identifying the date of generation of the folder and a two-digit serial number that is not the same as any other folder name. In the example in FIG. 10, a folder "07010101" is generated.

In step S1607, the digital camera 100' generates a DCIM folder below the layer of the generated folder B. Then, the processing advances to step S1608. In step S1608, the digital camera 100' moves the DCIM folder and lower folders, which have been generated below the top layer, and all the files included in the DCIM folder and lower folders to the directory below the DCIM folder generated below the folder B, without changing the folder structure (the folder names and the file names). In the example in FIG. 10, the folder "103FOLDER" below the DCIM folder (9(1) in FIG. 9) is moved to the layer below the DCIM folder below the folder "07010101" (10(1) in FIG. 10).

Thus, the digital camera 100' records on the external recording medium 300, which is connected to the expansion apparatus 400, an image file generated as a file having a file name provided based on the current folder number Dc and the current file number Fc by the shooting operation, as described above.

More specifically, if a folder having a folder number greater than the folder number x of the image file be recorded based on the request from the digital camera 100' is previously recorded on the external recording medium 300, or if a file having a file number equal to or greater than the file number y is previously recorded on the external recording medium 300, then the expansion apparatus 400 changes the path of the folder structure to the layer below the newly generated folder without changing the folder structure of the DCIM folder and lower folders. Furthermore, the expansion apparatus 400 generates a new folder having the folder number x for storing the captured image file and records a captured image file to be recorded based on the request from the digital camera 100' in the layer immediately below the newly generated folder.

According to the folder naming regulation for generating the folder name in step S1606, ninety-nine folders can be generated at a maximum. If the same folder number has been already used for the existing folder and a new folder having the same folder number cannot be generated, the digital camera 100' can issue a warning message to the user notifying so.

The present invention can be implemented by a digital camera that can selectively use the external recording medium 300 and the memory card 200 and has a double recording mode for recording the same image file on two recording media at the same time.

In the case where the present invention is applied to such a digital camera, if the external recording medium 300 is replaced from an external recording medium having the folder structure in FIG. 7 to an external recording medium having the folder structure in FIG. 9 in the power saving mode of the external recording medium 300, the image file is recorded in the same path for both the memory card and the external recording medium during the double recording mode. Accordingly, the consistency and the integrity of the file names can be maintained between different recording media.

As described above, according to the present exemplary embodiment, even when the external recording medium 300 connected to the expansion apparatus 400 is in the power saving mode, the shooting operation can be performed before the completion of the recording processing on the external recording medium 300, using the information stored in the non-volatile memory 119.

Furthermore, in the case of recording an image file on the external recording medium performed by the expansion apparatus 400, the digital camera 100' checks whether the file number of the file recorded on the external recording medium and the file number of the file to be recorded overlap each other. Accordingly, it can be prevented that the user overwrites an image file by mistake even when the digital camera 100' cannot recognize that the external recording medium has been replaced.

Moreover, it can be prevented that the file names of the same files recorded on different recording media differ from each other during the double recording mode, in which the same image file is recorded on two recording media at the same time.

Accordingly, the present exemplary embodiment can implement an image pickup apparatus having a high response capability and a high reliability, even in the case where an external recording medium that is connected to the expansion apparatus 400 is used.

Third Exemplary Embodiment

Now, a third exemplary embodiment of the present invention will be described below.

The present exemplary embodiment relates to the reproduction of a file stored on the external recording medium 300, in contrast to the above-described first and the second exemplary embodiments.

An interchangeable-lens digital camera according to the present exemplary embodiment has the configuration similar to that in the first exemplary embodiment.

Generally, in the case of using a digital camera, the folder structure of a recording medium is configured according to the DCF format. Accordingly, the file to be reproduced by a reproduction unit of a digital camera is generally recorded in a directory of a folder having a folder structure configured according to the DCF format. Thus, files stored in the top DCIM folder or lower folders on the recording medium can be reproduced.

As described above in the first and second exemplary embodiments, if an image file having the same file number as an existing image file is to be recorded, then the digital camera moves the DCIM folder and lower folders, which have been generated below the top layer, and all of the files included in the DCIM folder and lower folders to the directory below the DCIM folder generated below a newly generated folder without changing the folder structure (the folder names and the file names).

That is, since the folder structure of the newly generated folder and lower folders has a folder structure according to the DCF format, image files can be easily reproduced if the user can select a folder to be reproduced.

Figure 17:
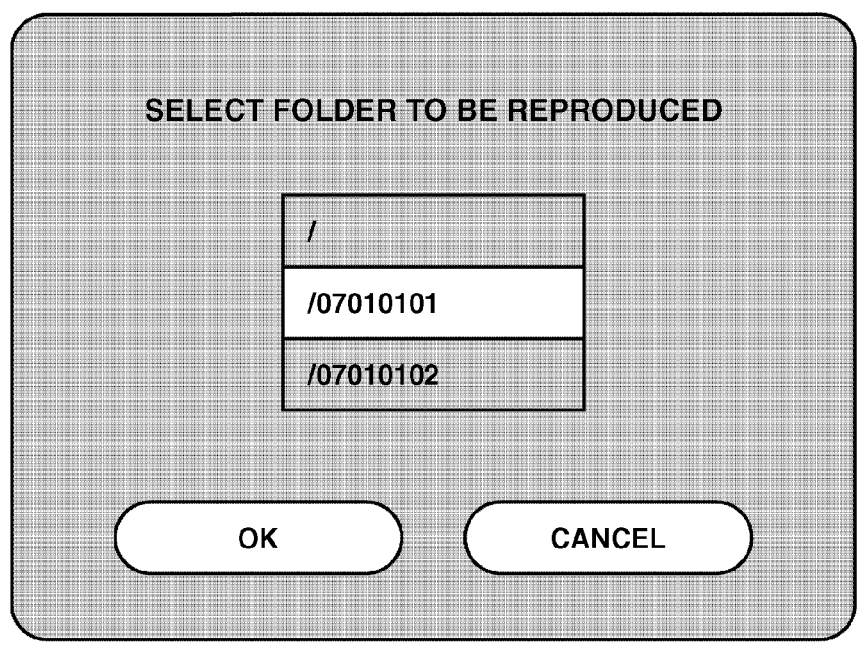
FIG. 17 illustrates an example of a display screen via which a user selects a folder to be reproduced according to a third exemplary embodiment of the present invention.

FIG. 17 illustrates an example of a user interface display screen that enables the user to select a folder to be reproduced by a user operation according to the present exemplary embodiment. The user can operate the menu operation switch 121 (FIG. 1) to select any of the paths displayed on the user interface display screen. Thus, the user can select a folder to be reproduced.

The path selected by the user can be stored in the memory 113 (FIG. 1). When the user performs an operation for starting the reproduction of the selected path, the digital camera 100 reproduces the files in the DCIM folder below the selected path.

During the reproduction, the use needs only to determine which root folder is to be reproduced. Since the DCIM folder and lower folders have the folder structure similar to the folder structure according to the DCF format, the user can reproduce an image file in the selected path without performing a complicated determination operation.

As described above, according to the present exemplary embodiment, if the path for the folder stored on the external recording medium has been changed, as in the first and the second exemplary embodiments, image files in the folder whose path has been changed can be easily reproduced.

Accordingly, the present exemplary embodiment can implement an image pickup apparatus having a high response capability and a high reliability even in the case where an external recording medium that requires a long period of time to be ready for use is used.

According to the present exemplary embodiment, an image pickup apparatus can be implemented having a high reliability that can prevent a user from overwriting an image file by mistake, without degrading a response capability of the image pickup apparatus, even in the case where an external recording medium connected to the image pickup apparatus is in the power saving mode.

Other Exemplary Embodiments

The present invention can also be achieved by providing a system or a device with a storage medium (or a recording medium) that stores software program code implementing the functions of the embodiments and by reading and executing the program code stored in the storage medium with a computer of the system or the device (a central processing unit (CPU) or a micro processing unit (MPU)).

In this case, the program code itself, which is read from the storage medium, implements the functions of the above-described embodiments, and accordingly, the storage medium storing the program code constitutes the present invention.

As the storage medium for supplying such program code, a floppy disk, a hard disk, an optical disk, a magneto-optical disk (MO), a compact disc-read only memory (CD-ROM), a compact disc recordable (CD-R), a compact disc rewritable (CD-RW), a digital versatile disc (DVD), a DVD-read only memory (DVD-ROM), a DVD-random access memory (DVD-RAM), a DVD-rewritable (DVD-RW), a DVD+rewritable (DVD+RW), a magnetic tape, a nonvolatile memory card, and a read-only memory (ROM), for example, can be used.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk. The functions of the above-described embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-344282 filed Dec. 21, 2006, which is hereby incorporated by reference herein in its entirety.

What is claimed is:

1. An image pickup apparatus comprising:
an image pickup unit configured to capture an image of an object;
a storing unit configured to store file path information of the image file;
a specifying unit configured to specify a file path for the image file based on the file path information;
a determination unit configured to determine whether a second image file having a second file path that is the same as the file path exists on an external recording medium;
a file path changing unit configured to, if the determination unit determines that the second image file having the second file path that is the same as the file path exists on the external recording medium, change the second file path recorded on the external recording medium, wherein the file path changing unit changes the second file path recorded on the external recording medium based on a newly generated folder to which the second image file belongs, and without changing a file name of the second image file recorded on the external recording medium; and
a recording control unit configured to record the image file on the external recording medium, the image file having the file path specified by the specifying unit.

2. The image pickup apparatus according to claim 1, further comprising:
a power supply unit configured to supply power to the external recording medium; and
a power saving control unit configured to reduce an amount of power supplied to the external recording medium.

3. The image pickup apparatus according to claim 1, further comprising:
a reproduction unit configured to reproduce an image file recorded on the external recording medium; and
a reproduction folder changing unit configured to change an image file having the file path changed by the file path changing unit to an image file to be reproduced.

4. The image pickup apparatus according to claim 1, wherein the file path and the second file path each include a folder name and a file name.

5. A method for controlling an image pickup apparatus, the method comprising:
capturing an image of an object;
storing file path information of the image file;
specifying a file path for the image file based on the file path information;
determining whether a second image file having a second file path that is the same as the file path exists on an external recording medium;
changing the second file path recorded on the external recording medium if a determination in the determining step is that the second image file having the second file path that is the same as the file path exists on the external recording medium, wherein in the file path changing step the second file path recorded on the external recording medium is changed based on a newly generated folder to which the second image file belongs, and without changing a file name of the second image file recorded on the external recording medium; and
recording the image file on the external recording medium, the image file having the specified file path.

6. A computer-readable storage medium storing instructions which, when executed by an apparatus, cause the apparatus to perform operations comprising:
capturing an image of an object;
storing file path information of the image file;
specifying a file path for the image file based on the file path information;
determining whether a second image file having a second file path that is the same as the file path exists on an external recording medium;
changing the second file path recorded on the external recording medium if a determination in the determining step is that the second image file having the second file path that is the same as the file path exists on the external recording medium, wherein in the file path changing step the second file path recorded on the external recording medium is changed based on a newly generated folder to which the second image file belongs, and without changing a file name of the second image file recorded on the external recording medium; and
recording the image file on the external recording medium, the image file having the specified file path.

7. An image management apparatus comprising:
an input unit configured to input image data;
a storing unit configured to store file path information of the image file;
a specifying unit configured to specify a file path for the image file based on the file path information;
a determination unit configured to determine whether a second image file having a second file path that is the same as the file path exists on an external recording medium;
a file path changing unit configured to, if the determination unit determines that the second image file having the second file path that is the same as the file path exists on the external recording medium, change the second file path recorded on the external recording medium, wherein the file path changing unit changes the second file path recorded on the external recording medium based on a newly generated folder to which the second image file belongs, and without changing a file name of the second image file recorded on the external recording medium; and
a recording control unit configured to record the image file on the external recording medium, the image file having the file path specified by the specifying unit.

* * * * *